United States Patent [19]

Price et al.

[11] Patent Number: 5,342,117
[45] Date of Patent: Aug. 30, 1994

[54] BRAKE PULSING APPARATUS

[76] Inventors: Thomas D. Price, 8006 E. Rockcreek Rd., Norman, Okla. 73071; James C. Roberts, 7716 S. Ranch Rd., El Reno, Okla. 73036

[21] Appl. No.: 82,039

[22] Filed: Jun. 24, 1993

Related U.S. Application Data

[63] Continuation-in-part of Ser. No. 916,904, Jul. 20, 1992, abandoned.

[51] Int. Cl.$^5$ .............................................. B60T 13/74
[52] U.S. Cl. .......................................... 303/3; 303/20; 303/24.1; 303/15; 303/93; 188/112 A
[58] Field of Search ................. 303/19, 16, 118.1, 104, 303/105, 106, 24.1, 61, 93, 94, 95, 20, 7, 9.67, 9.68, 3, 10, 15; 188/112 A

[56] References Cited

U.S. PATENT DOCUMENTS

| | | | |
|---|---|---|---|
| 2,184,557 | 12/1939 | Lloyd | 303/3 |
| 2,924,306 | 2/1960 | Martin | 188/152 |
| 3,617,098 | 11/1971 | Lelber | 303/21 F |
| 3,698,772 | 10/1972 | Nixon | 303/21 BE |
| 3,726,567 | 4/1973 | Burckhardt | 303/21 F |
| 3,953,084 | 4/1976 | Pittet, Jr. et al. | 303/24 R |
| 3,976,336 | 8/1976 | Sekiguchi | 303/118.1 |
| 4,196,936 | 4/1980 | Snyder | 188/112 A |
| 4,538,859 | 9/1985 | Russell | 303/24 R |
| 4,726,627 | 2/1988 | Frait et al. | 303/24 R |

OTHER PUBLICATIONS

Rockwell WABCO Vehicle Control Systems "Anti-Lock Braking Systems for Trucks, Tractors & Buses" Apr. 1992; 8 pages.
U.S. Department of Transportation; DOT HS 807 846 Final Report "An In-Service Evaluation of the Reliability, Maintainability, and Durability of Antilock Braking Systems (ABS) for Heavy Truck Tractors" Mar. 1992, pp. 2–10 through 2–17.

*Primary Examiner*—Robert J. Oberleitner
*Assistant Examiner*—Lee W. Young
*Attorney, Agent, or Firm*—Bill D. McCarthy; Louis W. Watson

[57] ABSTRACT

A brake pulsing apparatus for use in vehicles having vacuum hydraulic, pneumatic or electric brake systems. The brake pulsing apparatus includes a solenoid valve, for vacuum hydraulic and pneumatic brake systems, or a relay, for electric brake systems, mounted in a vacuum, pressurized air or electrical line that transmits a brake signal to a brake assembly of the vehicle when the brake system is engaged, a pendulum and proximity switch that sense deceleration of the vehicle, and a timer relay connected between the proximity switch and the solenoid valve or relay to repetitively close the valve or open contacts of the relay when the brake system is engaged. The pendulum and timer relay are adjustable to adapt the brake pulsing apparatus to the type of vehicle in which the apparatus is used. In vacuum hydraulic or pneumatic systems, the solenoid valve repetitively admits air into the vacuum line or exhausts air from the pressurized air line during vehicle braking and a cup, having an orifice through its closed end, can be mounted in a port of the valve to admit or exhaust air at a controlled rate. A second solenoid valve or relay can be mounted in the brake system of a trailer towed by a tractor and operated by the timer relay to synchronously pulse brakes of the trailer with pulsation of brakes of the tractor.

24 Claims, 9 Drawing Sheets

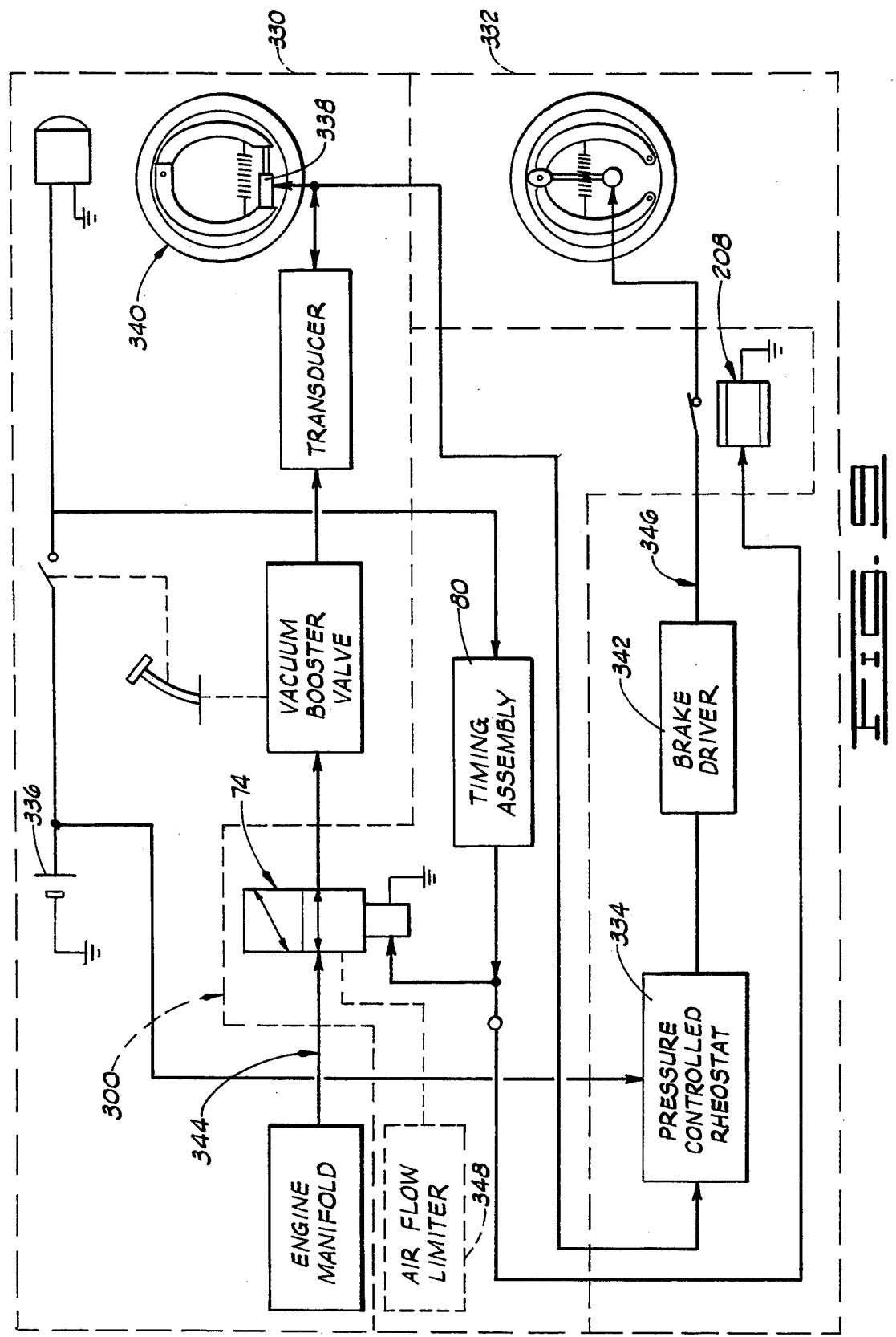

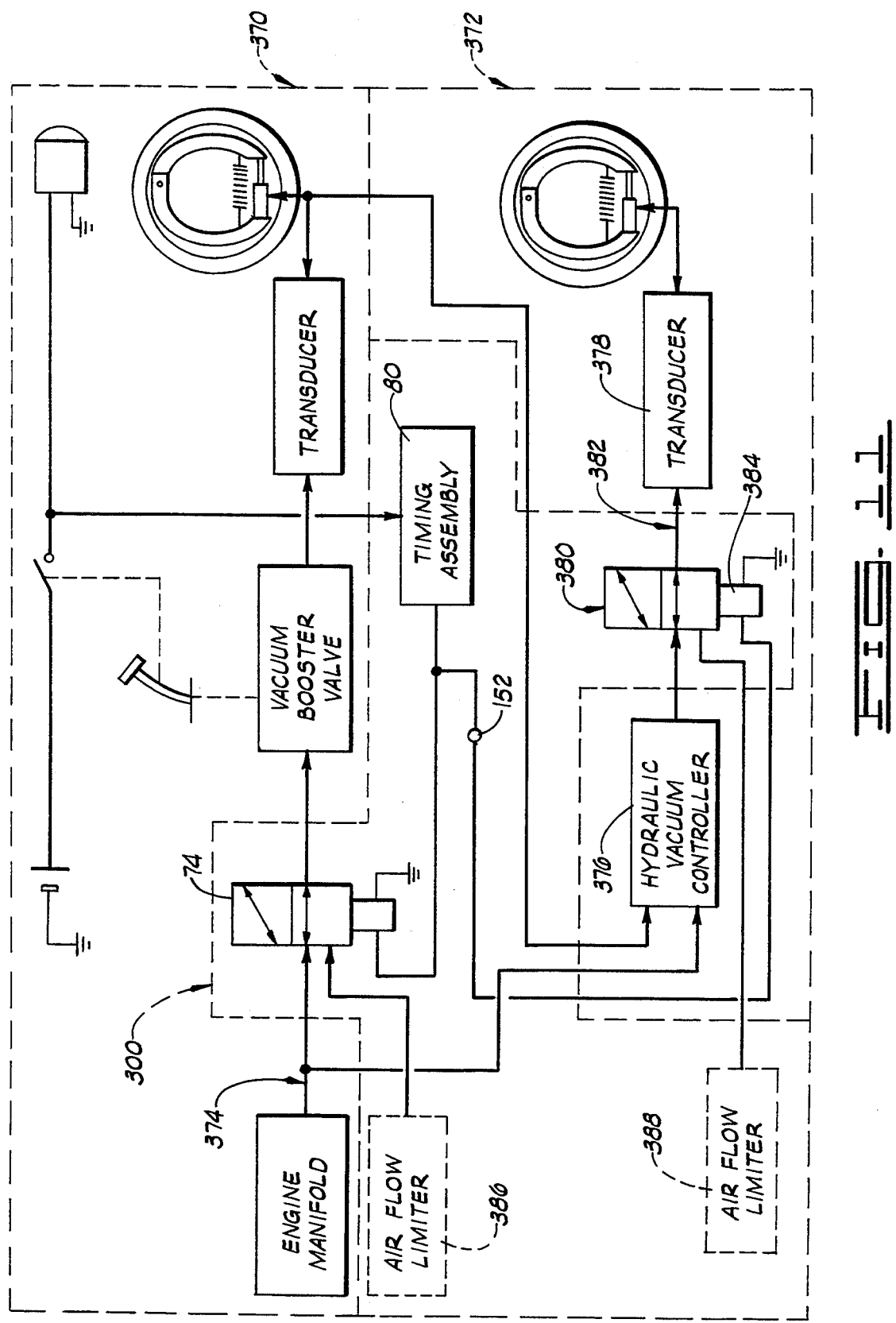

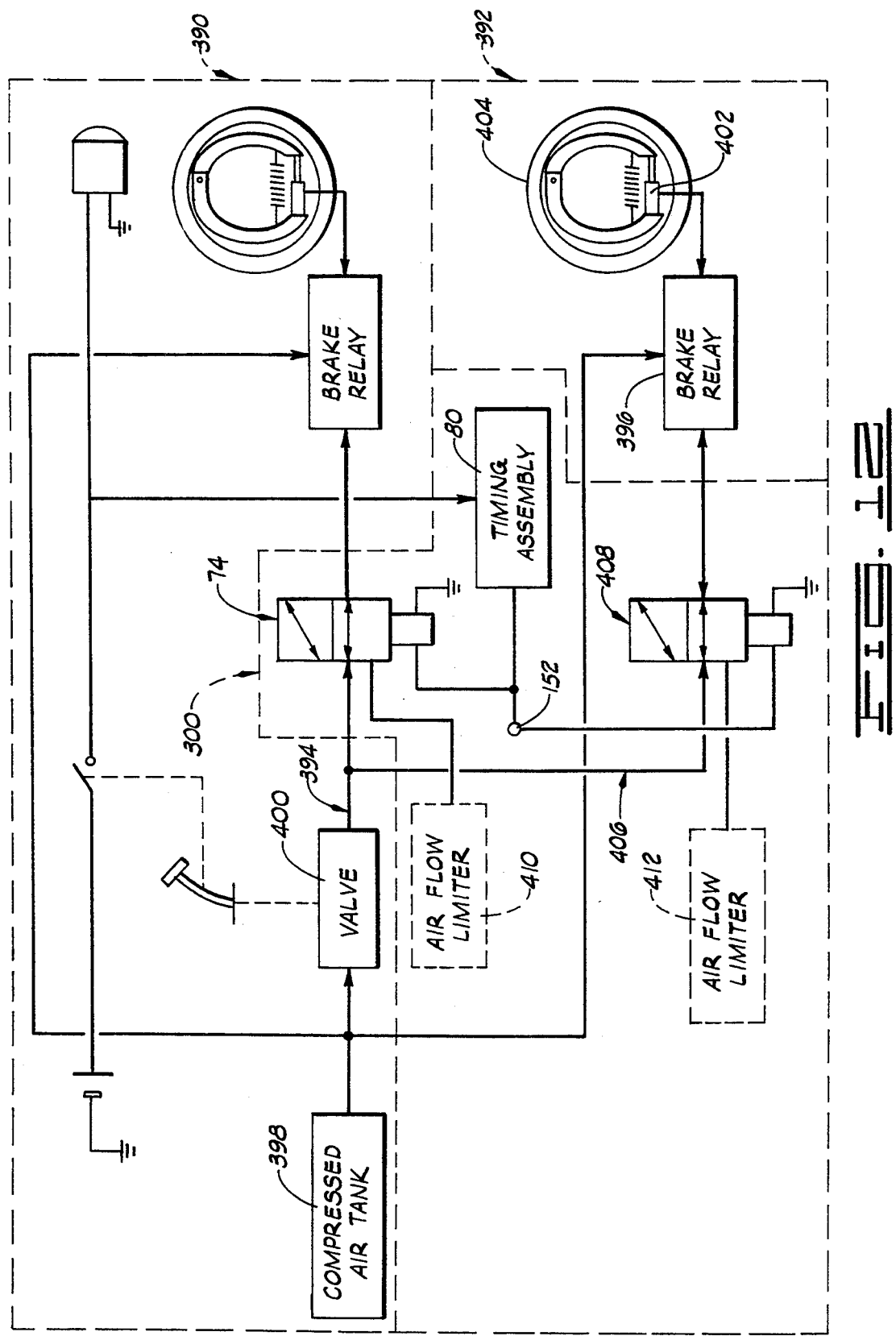

BRAKE PULSING APPARATUS

CROSS REFERENCE TO RELATED APPLICATIONS

The present application is a continuation-in-part of copending U.S. patent application Ser. No. 07/916,904 entitled "Brake Pulsing Apparatus" filed Jul. 20, 1992, now abandoned.

BACKGROUND OF THE INVENTION

1. Field of the Invention

The present invention relates generally to improvements in automotive equipment and, more particularly but not by way of limitation, to improvements in brake systems of automotive vehicles.

2. Brief Description of the Prior Art

As is well known, it is not desirable in braking a vehicle for the wheels to lock so that tires slide on the roadway while the vehicle is brought to rest; rather, a vehicle can be stopped in the shortest distance if rolling contact between the tires and the roadway is maintained during braking of the vehicle. Thus, experienced drivers often "pump", or repetitively release, the brakes of their vehicles during braking to ensure that the brakes do not lock up and thereby increase the distance required to bring their vehicles to a stop.

However, while it is well known that brakes should not be continuously operated during the braking of a vehicle, such operation nevertheless frequently occurs as the result of either inexperience on the part of a driver or as a natural reaction to an emergency situation. Since it will often be the case that an emergency will require the halting of a vehicle as quickly as possible, a driver may very well react to the emergency by applying, and maintaining, maximum force on the brake pedal of his vehicle and such reaction may very well exacerbate the emergency by causing sliding of the vehicle to occur. Thus, instead of avoiding the consequences of the emergency situation, he inadvertently causes the consequences to occur, often to the injury of himself or others.

To avoid this danger, anti-lock brake systems have been developed and are offered, often as an option, to purchases of new vehicles. However, prior art anti-lock brake systems; more particularly, the use of such systems, has not provided a complete solution to the problem that brake locking during stops presents. Thus, for example, in prior art anti-locking brake systems, the anti-lock features are often achieved through the use of complex computerized or other electronic circuitry operated from wheel rotation sensors and, consequently, such systems can add a not inconsiderable increase to the purchase price of a vehicle. In large part, the cost of such anti-lock brakes systems stems from the control of the system using sensors that detect the imminence of slipping of individual wheels and operate to prevent slipping on a wheel-by-wheel basis. In the type of driving done by many drivers, this cost cannot be justified with the result that many purchasers of a vehicle will forego the option of anti-lock brakes to avoid the price that must be paid to obtain the option.

Equally important, many older vehicles having brake systems without anti-locking features are on the road and, prior to the present invention, no practical means has been available to provide the brake systems of these vehicles with anti-lock capabilities. A variety of types of brake systems are in current use; for example, vacuum assisted hydraulic, pneumatic and electric so that an anti-lock device that might be suitable for one type of brake system will not be suited to another type. Moreover, components used in brake systems currently in use are not standardized but vary from one vehicle to another. Such variation stems, in part, from engineering choices made by the manufacturers of vehicles and, in part, from variations in types of vehicles that are found on the road. Thus, for example, an anti-lock device that might be suitable for a passenger automobile may not be suitable for a tractor-trailer combination that has the same general type of brake system. Similarly, an anti-lock system that might be suitable for a vehicle having one source of manufacture may not be suited to a vehicle having another source of manufacture. Thus, retrofit of an existing brake system can require, substantially, the replacement of the existing brake system with a brake system having anti-lock features. The cost of such replacement is not acceptable to many vehicle users.

Moreover, tractor-trailer combinations present special problems. As is known in the art, the brakes of a trailer must be applied concurrently with the brakes of the tractor to prevent "jackknifing" of the combination and it is common practice to provide trailers with brake systems that are actuated when deceleration of the tractor occurs. Similarly, the brake system of a trailer may be fully integrated with the brake system of the tractor. However, as is also known, a tractor may be used with different trailers at different times and the brake systems of the trailers may differ from one use to another. Thus, for example, a tractor having a pneumatic brake system may be used with a trailer having a pneumatic brake system on one occasion and with a trailer having an electric brake system on another occasion. Thus, it is often not practical to integrate the trailer brake system with the tractor brake system with the result that the cost of providing both the tractor and the trailer with anti-lock brake systems can be substantial.

Thus, while it is possible, in principle, to adapt prior art anti-lock brake systems to substantially any vehicle operated under substantially any set of circumstances, the cost of doing so militates against the adaption.

SUMMARY OF THE INVENTION

The present invention exploits characteristics that all vehicle brake systems have in common to provide an inexpensive apparatus that can be utilized to provide anti-lock characteristics to brake systems of substantially any type and, moreover, can be readily incorporated into existing brake systems to provide such systems with an anti-lock capability. Even further, the apparatus of the present invention permits integration of the brake systems of tractor-trailer combinations without regard to the type of brake system that either may have.

More particularly, the present invention recognizes that, while brake systems may be of various types and may be constructed using components that vary from one system to another, any brake system can be generally characterized as comprising a brake assembly that responds to a brake signal to provide a braking effect on the wheels a vehicle, a source for the brake signal, a brake signal conduit that transmits the brake signal from the source to the brake assembly, and a brake operating assembly that is activated to initiate braking of the vehicle. Thus, anti-lock characteristics can be introduced into any system by repetitively interrupting the transmission of the brake signal to achieve an automatic "pumping" action that is employed by experienced drivers. Moreover, such interruption can be achieved using inexpensive components that can be selected to adapt the anti-lock apparatus to the particular type of brake system with which the vehicle is provided.

Thus, in its most general description, the apparatus of the present invention is a brake pulsing apparatus that includes a brake signal interrupter that is interposed in the brake signal conduit of a vehicle brake system to interrupt the brake signal in response to an interrupt signal, a timing device that can be enabled to repetitively transmit the interrupt signal to the interrupter, and an accelerometer, which can be inexpensively constructed using a pendulum and a proximity switch, that senses deceleration of the vehicle when the brake system is activated to enable the timing device. Specific embodiments of the invention can then be adapted to any vehicle brake system by selection of the brake signal interrupter to match the type of brake system at hand. Thus, for a vehicle having a vacuum hydraulic or pneumatic brake system, the interrupter can be a solenoid valve interposed in a vacuum or pressurized air line of the vehicle brake system; for a vehicle having an electric brake system, a relay having contacts interposed in an electrical conductor of the vehicle brake system can be utilized. Consequently, the brake pulsing apparatus can be employed to provide an anti-lock capability to any brake system by suitable choice of the brake signal interrupter.

Moreover, the general construction of the brake pulsing apparatus of the present invention provides a flexibility that can be exploited to provide integrated anti-lock characteristics for brake systems of tractor-trailer combinations without regard to the types of brake systems that are utilized in the tractor and trailer and without regard to whether the same type of system might be used. To this end, the brake pulsing apparatus can additionally comprise an auxiliary brake signal interrupter that is mounted in a brake signal conduit of the trailer and receives the interrupt signals transmitted by the timing device to the brake signal interrupter of the tractor. Moreover, the brake signal interrupters need not be of the same type; for example, in a tractor having a pneumatic brake system utilized to tow a trailer having an electric brake system, the brake signal interrupter for the tractor brake system can be selected to be a solenoid valve while the brake signal interrupter for the trailer can be selected to be a relay.

Similarly, the flexible construction of the brake pulsing apparatus of the present invention permits adaptations that can be utilized to tailor the brake pulsing apparatus to a variety of vehicles having different braking characteristics and to the type of driving; for example, stop and go, in which the vehicle will be most commonly engaged. For example, the use of a pendulum to sense deceleration of the vehicle with which the brake pulsing apparatus is used can be further exploited to adjust the characteristics of the brake pulsing apparatus to those of the vehicle by appropriate selection of pendulum dynamic characteristics. Thus, by choosing the pendulum characteristics, the brake pulsing apparatus of the present invention can be adapted to provide substantially ideal brake pumping action for vehicles ranging from passenger automobiles to large, multi-axle tractor-trailer transport combinations. Other adaptive features can similarly be provided in a manner that will be come clear from the detailed description of the brake pulsing apparatus that will be presented below.

An important object of the present invention is to provide an apparatus for automatically pulsing the brakes of a vehicle that can be incorporated into substantially any type of brake system to provide the brake system anti-lock characteristics.

Another object of the present invention, while achieving the before-stated object, is to provide a brake pulsing apparatus that is inexpensive to manufacture and readily incorporated into existing vehicle brake systems.

Still a further object of the present invention, while achieving the before-stated objects, is to provide anti-lock braking characteristics for brake systems of tractor-trailer combinations.

Yet another object of the present invention is to provide a brake pulsing apparatus that can be readily adapted to tailor the anti-lock braking action of the brake pulsing apparatus to the braking characteristics of the vehicle with which the brake pulsing apparatus is used.

Other objects, features and advantages of the present invention will become apparent from the following detailed description when read in conjunction with the drawings and appended claims.

BRIEF DESCRIPTION OF THE DRAWINGS

FIG. 6 is a block diagram of an exemplary brake system illustrating the construction and mounting of the brake pulsing apparatus of the present invention in a pneumatic brake system.

FIG. 7 is a block diagram of an exemplary brake system illustrating the construction and mounting of the brake pulsing apparatus of the present invention in an electric brake system.

FIG. 8 is a general block diagram illustrating a modification of the brake pulsing apparatus of the present invention for incorporation in a vehicle having multiple brake systems.

FIG. 9 is a block diagram of an exemplary tractor-trailer brake system illustrating the construction and mounting of the modified brake pulsing apparatus for a tractor having a vacuum hydraulic brake system and a trailer having an electric brake system.

FIG. 11 is a block diagram of an exemplary tractor-trailer brake system illustrating the construction and mounting of the modified brake pulsing apparatus for a tractor having a vacuum hydraulic brake system and a trailer having a vacuum hydraulic brake system.

FIG. 12 is a block diagram of an exemplary tractor-trailer brake system illustrating the construction and mounting of the modified brake pulsing apparatus for a tractor having a pneumatic brake system and a trailer having a pneumatic brake system.

DESCRIPTION OF FIG. 1

Figure 1:
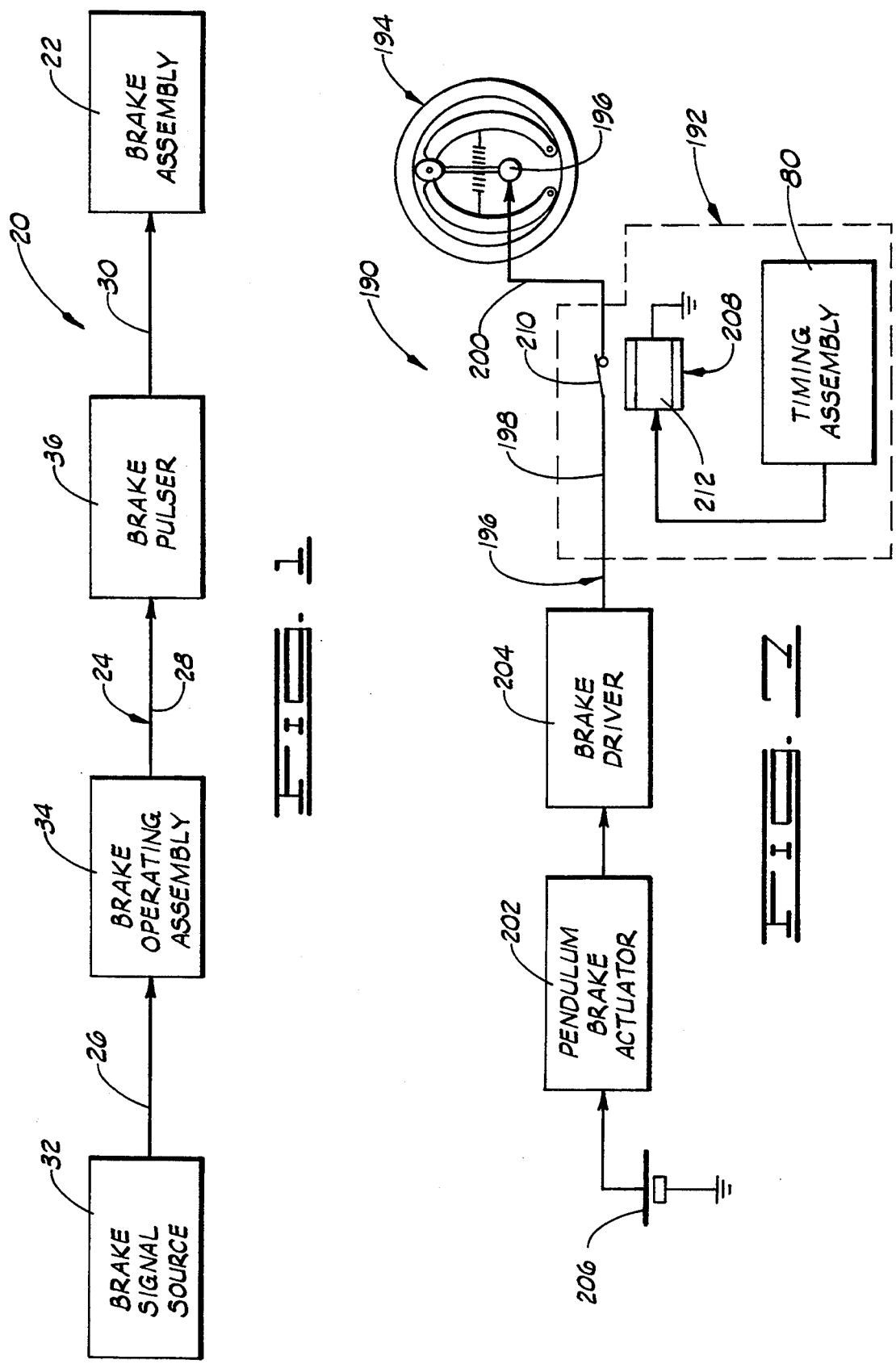
FIG. 1 is a general block diagram of a vehicle brake system incorporating a brake pulsing apparatus of the present invention.
Figure 2:
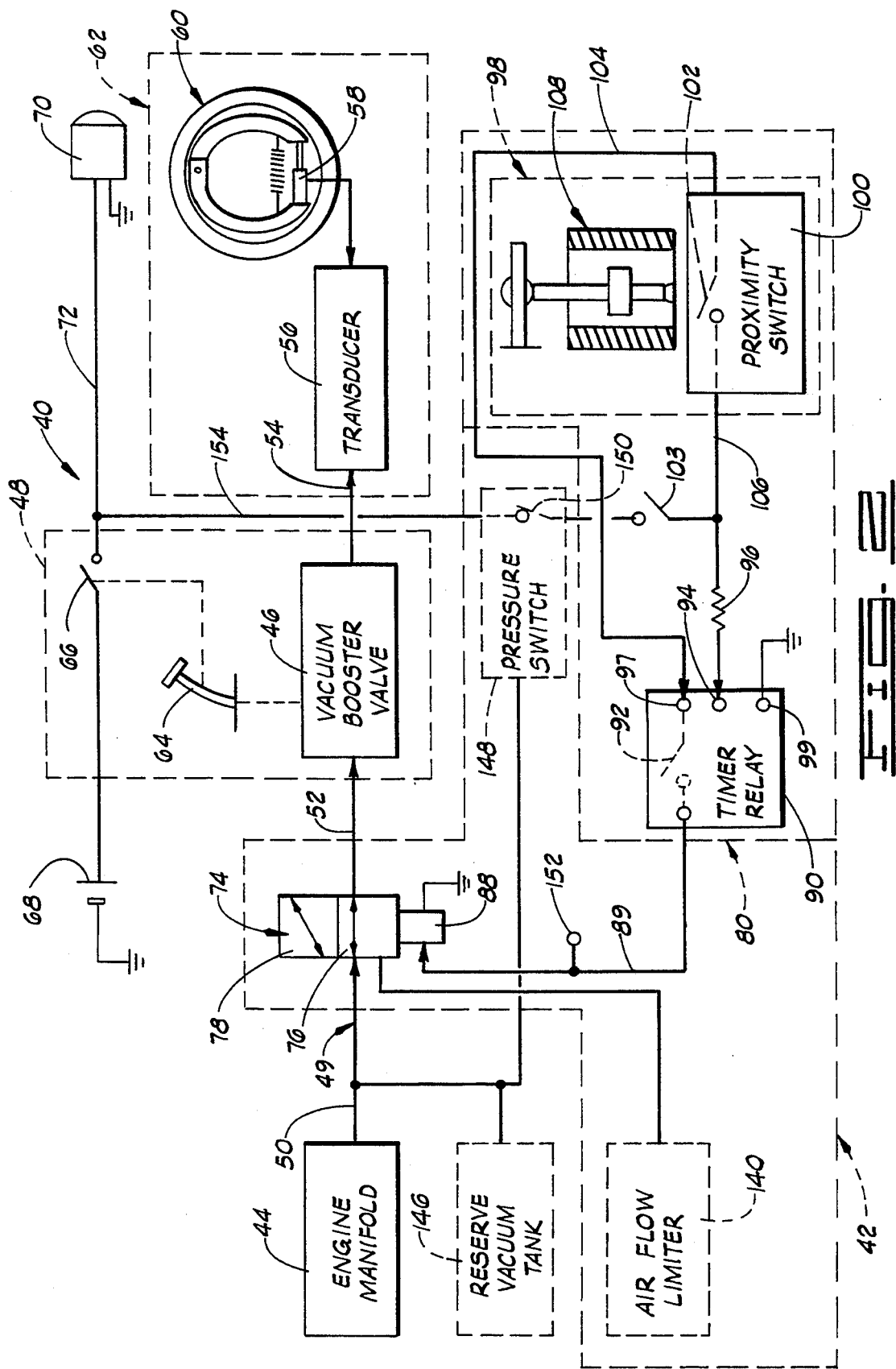
FIG. 2 is a block diagram of an exemplary brake system illustrating the construction and mounting of the brake pulsing apparatus of the present invention in a vacuum hydraulic brake system.

As has been noted above, an important feature of the brake pulsing apparatus of the present invention is that it can be used with substantially any type of conventional brake system. Accordingly, to provide a complete description of the invention, it will be useful to first discuss the manner in which the invention is adapted to brake systems in general before proceeding to specific examples of brake systems and the use of the invention therein. FIG. 1 has been provided for the general discussion and FIGS. 2, 6 and 7 illustrate the use of the brake pulsing apparatus of the present invention in conventional hydraulic, pneumatic and electric brake systems, respectively.

Referring to FIG. 1, a vehicle brake system 20 is generally characterized as comprising a brake assembly 22 which responds to a signal received on a brake signal conduit 24 having conduit portions indicated at 26, 26, and 30, to cause a braking effect on a vehicle (not shown) to occur. As will be discussed, the brake signal conduit 24 can take on numerous forms corresponding to a variety of types of brake systems in which different types of brake signals are transmitted to different types of brake assemblies. For example, the brake signal may be a vacuum introduced into a vacuum line in one brake system and an electrical signal transmitted along an electrical conductor in a different brake system. By merely modifying the precise structure of one element of the brake pulsing apparatus of the present invention as will be described below, provision can be made for both of these and for other contingencies.

In order that the brake system 20 be operable to halt a vehicle, the brake system is further comprised of a brake signal source 32, having a construction selected in relation to the type of brake assembly 22 and the nature of the brake signal conduit 24, and a brake operating assembly 34 that is mounted in the brake signal conduit 24 and is operable to permit transmission of the brake signal along the brake signal conduit 24 to effect braking of the vehicle. In the a non-actuated state of the brake operating assembly 34, the brake operating assembly 34 blocks the transmission of the brake signal for normal driving.

When the brake system 20 includes a brake pulsing apparatus of the present invention, indicated at 36 in FIG. 1, such apparatus is mounted within the brake signal conduit 24 in series with the brake operating assembly 34. Thus, as shown in FIG. 1, the brake operating assembly 34 can be connected between the portions 26 and 28 of the brake signal conduit 24 and the brake pulsing apparatus 36 can be connected downstream of the brake operating assembly 34 between portions 28 and 30 of the brake signal conduit 24. Alternatively, the brake pulsing apparatus 36 may connected upstream of the brake operating assembly 34; that is, between portions 26 and 28 of the brake signal conduit 24 with the brake operating assembly 34 being connected between the portions 28 and 30. Indeed, a capacity for mounting the brake pulsing apparatus 36 and the brake operating assembly 34 in either order within the brake signal conduit 24 is exploited to facilitate the adaptation of a brake system to the use of the brake pulsing apparatus 36 of the present invention by the placement of the brake pulsing apparatus 36 at any convenient point in the brake system 20.

As will be discussed more fully below, the operation of the brake system 20 is modified by the inclusion of the brake pulsing apparatus 36 in a manner that will provide an automatic brake "pumping" action while otherwise maintaining all advantageous characteristics that have been built into the brake system 20. That is, the usual relationship between the force with which the brake operating assembly 34 is actuated and the strength of the braking action effected by the brake assembly 22 is maintained. More specifically, the effect of the operation of the brake pulsing apparatus 36 is only to repetitively interrupt the brake signal that is transmitted to the brake assembly 22 when the brake operating assembly 34 is operated to provide a brake "pumping" action while otherwise permitting the brake system 20 to carry out its functions in a normal manner without loss of any advantageous features that have been designed into the brake system. In order to further describe the construction and operation of the brake pulsing apparatus 36, specific brake systems and specific constructions for the brake pulsing apparatus 36 have been illustrated in FIGS. 2, 6 and 7 to which attention is now invited.

DESCRIPTION OF FIG. 2

FIG. 2 is a block diagram of a vacuum assisted hydraulic brake system 40 that has been adapted to use one preferred embodiment of a brake pulsing apparatus 42, of the present invention. For purposes of discussion, a representative vacuum boosted hydraulic brake system has been illustrated in the drawings in order to provide a concrete example which will facilitate an understanding of the invention and the manner in which it is used in a vacuum assisted hydraulic brake system. However, it will be recognized by those of skill in the art that vacuum assisted hydraulic brake systems take many forms so that the illustrated form is not intended to be limiting; rather, such form has been illustrated to provide a basis for discussing the use of the brake pulsing apparatus of the present invention. As will be clear from the description of FIG. 2 to follow, the feature of vacuum assisted hydraulic brake system that is relevant to the invention is a vacuum line in which the brake pulsing apparatus is mounted in the practice of the invention.

In vacuum assisted hydraulic brake systems, vacuum from a manifold 44 of the engine of a vehicle wherein the vacuum assisted hydraulic brake system 40 is employed is used to assist the vehicle operator in applying a suitable braking force to the vehicle and the preferred location for mounting the brake pulsing apparatus 42 in such systems is between the engine manifold 44, which serves as the brake signal source, and downstream components, such as an internal valve 46 of a vacuum booster, of which a brake operating assembly 48, may be comprised. Thus, as shown in FIG. 2, the brake signal conduit is selected to be a vacuum line 49 comprised of portions 50 and 52 with the brake pulsing apparatus 42 connected between portions 50 and 52 thereof. In such a brake system, the brake signal conduit is further comprised of a portion 54; for example, internal conduits of the vacuum booster, that transmit vacuum to a diaphragm in the vacuum booster, when the valve 46 is open, to apply pressure to a hydraulic master cylinder (not shown) which, with the portions of the vacuum booster, form a vacuum to hydraulic transducer 56. The transducer 56 and a plurality of conventional drum and shoe assemblies, one of which has been illustrated in FIG. 2 and designated 60 therein, form the brake assembly, designated 62 in FIG. 2, for retarding motion of the vehicle. (For illustrative purposes, the assembly 60 has been illustrated as and designated a drum and shoe assembly; however, it will be recognized by those of skill in the art that the assemblies 60 can equally well be disc assemblies commonly employed in vehicle brake systems or a combination of brake and shoe and disc assemblies.)

In normal operation of the brake system 40, the vacuum booster receives the engine manifold low pressure, constituting the brake signal, on the portions 50 and 52 of the vacuum line 49 and responds, when the valve 46 is opened, to operate the vacuum booster and hydraulic master cylinder; that is, the transducer 56, to cause the transmission of pressurized hydraulic fluid by the transducer 56 to hydraulic cylinders 58 of the assemblies 60 to spread shoes (not numerically designated in the drawings) of the assemblies 60 into contact with drums (not numerically designated in the drawings) upon which wheels (not shown) are mounted. Thus, rotation of the wheels of the vehicle is retarded to bring the vehicle to rest.

Operation of the brake system; specifically, the brake operating assembly 48, by the vehicle driver is effected by a brake pedal 64 which is mechanically linked to the valve 46, often via the hydraulic master cylinder of the transducer 56, and further linked to a brake light switch 66. Thus, when the operator of a vehicle having the brake system 40 actuates the brake operating assembly 48 to transmit the brake signal on the portion 54 of the brake signal conduit, the switch 66 will be closed to transmit electrical power from a vehicle battery 68 to a brake light 70. In the preferred practice of the present invention, a conductor 72 (by means of which electrical power is transmitted to the brake light 70) is utilized as a power source by the brake pulsing apparatus 42.

In the brake pulsing apparatus 42 for the vacuum assisted hydraulic brake system 40, the brake pulsing apparatus 42 is comprised of a solenoid valve 74, which is mounted between the portions 50 and 52 of the vacuum line 49, to alternatively transmit vacuum from the engine manifold 44 to the valve 46 or to repetitively interrupt the supply of vacuum to the valve 46 in response to interrupt signals received from a timing assembly 80, of which the brake pulsing apparatus is further comprised, as will be described below. To this end, and as illustrated in FIG. 2, the solenoid valve 74 is comprised of a first section 76 and a second section 78 and is of the type in which first section 76 provides fluid communication between inlet and outlet ports 82 and 84 respectively (shown in FIG. 4) of the valve 74 in a de-actuated state of the valve 74 and the second section 78 provides fluid communication between the outlet port 84 and a bleed port 86 (FIG. 4) in an actuated state of the valve 74.

In the practice of the invention, the portion 50 of the vacuum line 49 is connected between the engine manifold and the inlet port of the valve 74; the portion 52 is connected between the outlet port of the valve 74 and the internal valve 46; and the bleed port is open to the atmosphere. Thus, at such times that the solenoid valve 74 is actuated by reception of an electrical interrupt signal from the timing assembly 80, as will be described below, the vacuum provided by the engine manifold to the valve 46 of the vacuum booster via the first section 76 of the valve 74 during operation of the brake system 40 will be discontinued and air will be introduced into the portion 52 of the vacuum line 49 to interrupt the brake signal provided by the engine manifold 44.

The interrupt signals are repetitively provided during rapid braking of the vehicle to a solenoid 88 of the solenoid valve 74 on a signal path or conductor 89 by a timer relay 90 of which the timing assembly 80 is comprised. The timer relay is of the type having normally open internal contacts 92 that are repetitively closed at such times that the timer relay 90 is energized and, concurrently receives an enable signal on an enable terminal 94. A timer relay having these characteristics is the DR U series Timer available from Syrelec corporation of Carrolton, Tex. Energization of the timer relay 90, at such times that the operator of a vehicle having the brake system 40 actuates the brake operating assembly 48, is effected by connecting power terminals 97 and 99 of the timer relay 90 between the conductor 72, that provides power to the brake light 70 and the vehicle ground.

The enable signal to the timer relay 90 is provided, via a resistor 96 from an accelerometer, generally designated 98 in FIG. 2, comprised of a proximity switch 100 having normally closed contacts 102, held open in the absence of deceleration of the vehicle as will be described below, at such times that the proximity switch 100 receives electrical power at a power terminal via a conductor 104 leading to the conductor 72 between the vehicle brake light switch 66 and brake light 70. More particularly, power received at the power terminal of the proximity switch 100 is transmitted via the contacts 102 to an output terminal of the proximity switch at such times that the contacts 102 are in the normally closed state. A proximity switch having these characteristics is the 922 series Proximity Sensor available from Microswitch Corporation of Freeport, Ill. The output terminal of the proximity switch 100 is connected to the resistor 96, via conductor 106 to provide the enable signal to the enable terminal 94 of the timer relay at such times that the contacts 102 are closed and power is received at the power terminal of the proximity switch; that is, at times that the vehicle brakes are applied to transmit electrical power to the brake light 70 on the conductor 72.

Figure 3:
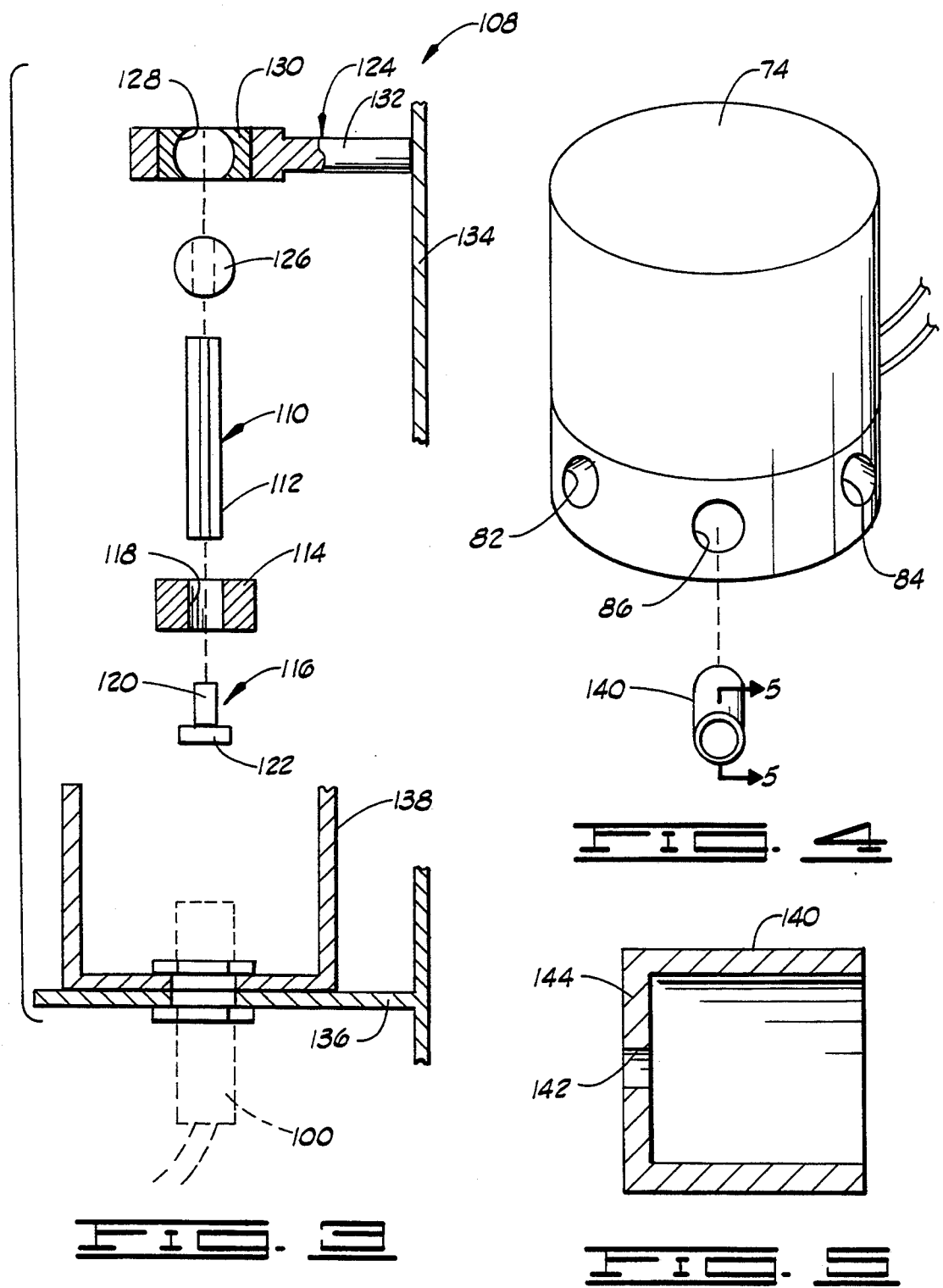
FIG. 3 is an exploded view in cross-section of a preferred construction for the pendulum used in the accelerometer of the brake pulsing apparatus of the invention.

The contacts 102 of the proximity switch 100 are held open at such times that a vehicle having the brake system 40 including the brake pulsing apparatus 42 is at rest or driving normally; that is, is not decelerating to a stop, by a pendulum that has been schematically indicated at 108 in FIG. 2 and illustrated in more detail in FIG. 3 to which attention is now invited. As will become apparent below, the pendulum 108 is provided with novel features which, in the practice of the present invention, can be used to adjust the brake pulsing apparatus 42 to the deceleration characteristics of a vehicle with which the brake pulsing apparatus 42 is used and the normal type of driving; for example, stop and go or highway, that can be expected of a specific vehicle. (For testing purposes, the brake pulsing apparatus 42 can further comprise a switch 103 connected between the conductors 104 and 106 to short circuit the contacts 102 of the proximity switch 100.)

Referring to FIG. 3, the pendulum 108 is comprised of a depending member 110 that is, in turn, comprised of a radially expansible shaft 112, a bob 114 and a proximity switch control member 116. The bob 114 has an opening 118, having a diameter smaller than the maximum diameter of the shaft 112, formed therethrough so that the bob 114 can be mounted on the shaft 112 by forcing lower portions of the shaft 112 through the opening 118. More importantly, the position of the bob 114 on the shaft 112 is readily adjustable for a reason that will be discussed below. A suitable way of providing this adjustment capability is to use a common rolled pin for the shaft 112 and a nut for the bob 114. The proximity switch control member 116 has a shaft portion 120 that is inserted in the lower end of the shaft 112 and a head portion 122 that overlays the proximity switch in the assembled accelerometer 98. It is contemplated that the diameter of the head portion 122 will be selected, by selecting a screw having an appropriate head size as the proximity switch control member, to provide the accelerometer with additional fine tuning characteristics as will be discussed below.

The pendulum 108 further comprises a support member 124 that can be constructed using a common automotive rod end including a ball 126 that fits into a cavity formed in a bearing 130 of a shank 132 of the rod end. Free, omnidirectional movement of the depending member 110, which is mounted on the rod end by forcing the upper end of shaft 112 into a hole formed through the ball 126, can be insured by rotating the ball 126 in cavity 128 with a grinding compound after the shaft 112 has been mounted in the ball 126 by mounting the shaft in a drill press to rotate the shaft.

The brake pulsing apparatus 42 is provided with a housing, portions of which have been illustrated in FIG. 3, for mounting the brake pulsing apparatus 42 on a vehicle and the shank 132 of the rod end is mounted on a vertical bulkhead 134 of the case to axially align the depending member 110 with the proximity switch 100 which is mounted on a horizontal bulkhead 136. An added feature of the accelerometer 98 is a cup 138 that is mounted on the bulkhead 136 with the proximity switch 100 to limit pivotation of the depending member 110 from a position of axial alignment with the proximity switch 100. By supporting the depending member for omnidirectional movement and limiting the extent to which such movement can occur, free movement of the depending member can be insured under road conditions in which lateral forces are exerted on the pendulum and, further, damage to the pendulum that might be caused by excessive displacement of the pendulum is avoided.

Returning to FIG. 2, shown therein are additional features that may be included in the brake pulsing apparatus 42 of the present invention to further permit such apparatus to be readily adapted for use with substantially any brake system that might be found on a vehicle. As noted above, air is introduced into the portion 52 of the vacuum line 49 and the connection between the portions 50 and 52 of the vacuum line 49 is disrupted to interrupt the brake signal between the engine manifold 44 and the valve 46. However, as will be clear to those of skill in the art, the construction of the vacuum booster of a vehicle brake system will vary from one brake system to another so that optimum braking of one vehicle may not occur if the solenoid valve 74 is selected to provide optimum braking of a vehicle of different size or manufacture. To permit adaptation of the brake pulsing apparatus 42 for use with any vehicle having a vacuum assisted hydraulic brake system, the brake pulsing apparatus can be further comprised of an air flow limiter 140 that can be connected to the bleed port of the solenoid valve 74 in any convenient manner. A preferred construction for the air flow limiter 140 and the manner in which the air flow limiter is connected to the bleed port of the solenoid valve 74 have been illustrated in FIGS. 4 and 5 to which attention is now invited.

Figure 4:
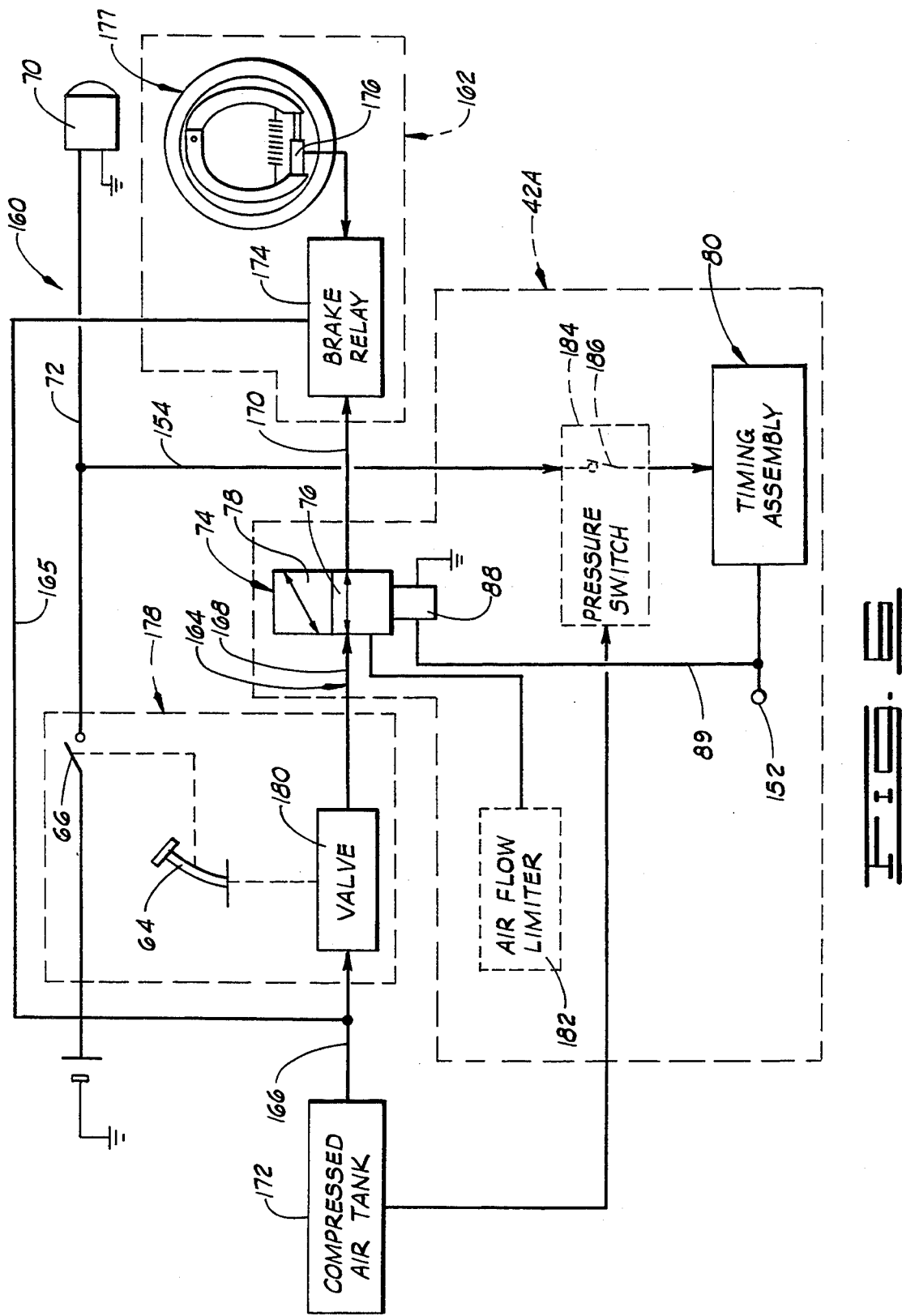
FIG. 4 is an exploded isometric view of a portion of one embodiment of the brake pulsing apparatus illustrating the mounting of an air flow limiter in a solenoid valve used in such embodiment.
Figure 5:
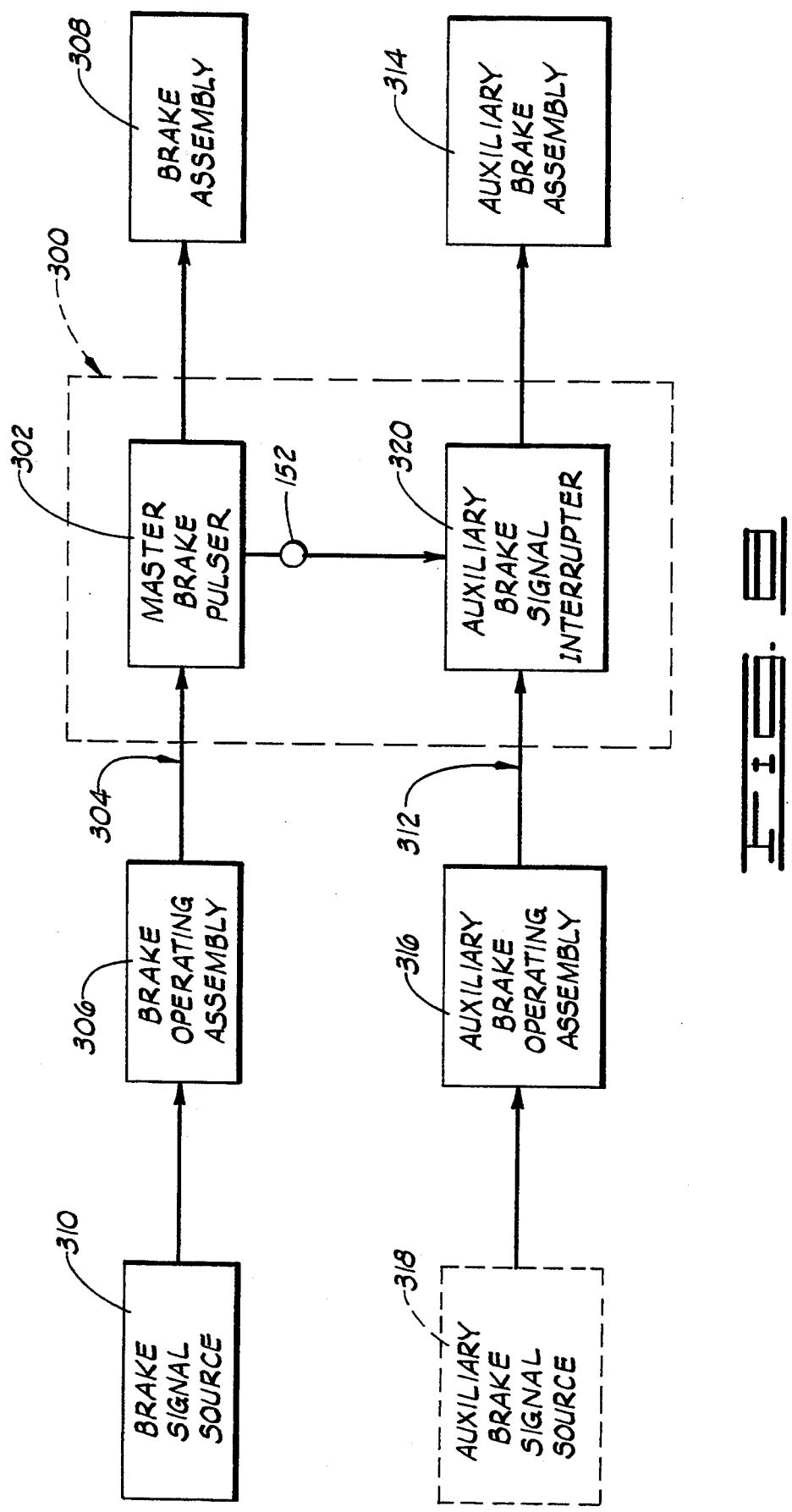
FIG. 5 is a cross section of the air flow limiter of FIG. 4 taken along line 5—5 of FIG. 4.

As shown in FIGS. 4 and 5, the air flow limiter 140 may conveniently take the form of a cup which can be mounted directly within the bleed port 86 by inserting the limiter 140 in the port 86 and securing the limiter 140 therein with an epoxy resin or other suitable adhesive. Fluid communication of the bleed port with the atmosphere is then provided by an orifice 142 formed through closed end 144 of the cup; that is, of the limiter 140. The diameter of the orifice can be selected to meter the flow of air into the portion 52 of the vacuum line 49 to adjust the characteristics of the brake pulsing apparatus 42 to the characteristics of the vehicle brake system with which such apparatus is used.

An additional feature the brake pulsing apparatus may comprise has also been illustrated in FIG. 2. In large vehicles, such as school buses, having a vacuum assisted hydraulic brake system, it is common practice to include a reserve vacuum tank 146 in the brake system to provide a sufficiently large volume that contains a vacuum to operate relatively large vacuum actuators commonly found in bus brake systems. In such a system, the brake system will include a warning light that signals the operator that pressure in the reserve vacuum tank has risen to a point that only sufficient vacuum remains to stop the vehicle. In such systems, the brake pulsing apparatus can be further comprised of a pressure switch 148 having contacts 150 connected serially with the power terminals 97 and 99 of the timer relay to disable the brake pulsing apparatus 42. Specifically, the pressure switch 148 is of the type having normally closed contacts that open when the switch 148 receives pressure that exceeds a pressure chosen to be above the pressure at which the vehicle's warning light will come on and the contacts 150 and the contacts are interposed in conductor 154 by means of which the timer relay receives electrical power from the vehicle battery via the break light switch 66 and brake line conductor 72.

A further feature of the brake pulsing apparatus 42 is an electrical connector 152 connected to the signal path 89 that transmits interrupt signals to the solenoid 88 of the solenoid valve 74. The purpose of the connector 152 will be discussed below.

Prior to discussing the operation of the brake system 40 and brake pulsing apparatus 42, it will be useful to briefly discuss the adaptive features of the brake pulsing apparatus that have been noted above. As will be clear to those of skill in the art, vacuum assisted brake systems are currently used on vehicles ranging from compact passenger automobiles to large tractor-trailer combinations used to transport cargo along highways. As will also be clear, vehicles in such range have considerably different driving and, more particularly, stopping characteristics. In general, small passenger automobiles can be decelerated at a much higher rate than a large tractor-trailer combination so that the pendulum 108 will be subjected to larger forces in a passenger automobile than in tractor-trailer combination. Thus, the vehicle characteristics can affect the operation of the brake pulsing apparatus of the invention. By providing the pendulum with the aforementioned adjustment provided by the positioning of the bob 114 on the shaft 112, the characteristics of the brake pulsing apparatus can be adjusted to match the deceleration characteristics of the vehicle in which the brake pulsing apparatus is used and the type of driving the vehicle operator will most often do. With respect to vehicle type, the bob 114 will generally be positioned nearer the lower end of the shaft 112 when the brake pulsing apparatus is used in a passenger automobile brake system than when it is used in the brake system of; for example, the tractor of a tractor trailer combination to provide a sensitivity to deceleration that is commensurate with the deceleration that can be expected to occur. Similarly, if the vehicle is expected to be used primarily for stop and go driving the head of the proximity switch control member can be selected to cause small deceleration of the vehicle to activate the brake pulsing apparatus of the present invention. It has been found that the brake pumping action provided by the brake pulsing apparatus can extend the lifetime of brake shoes and drums, with no reduction in stopping capability, by preventing the build up of heat in a brake system.

Similarly, it will not always be desirable that the brakes of a vehicle be pulsed during a stop. For example, should the vehicle be slowly decelerated so that locking of the brakes will not occur, no need for "pumping" the brakes occurs. Thus, the diameter of the head portion 122 of the proximity switch control member 116 can be selected to prevent operation of the brake pulsing apparatus, by permitting closure of the contacts 102 of the proximity switch as will be discussed below, to require a minimum deceleration that can be selected on the basis of vehicle type.

It will also be clear to those of skill in the art that vacuum booster used in different types of vehicles will have considerably different volumes so that the optimum amount of air that is permitted to enter the portion 52 of the vacuum line 49, to interrupt the brake signal, will vary from one vehicle to another. Such optimum can be adjusted to fine tune the operation of the brake pulsing apparatus to the vehicle in which it is used by adjusting the resistance of the resistor 96 or by the inclusion of an air flow limiter, having an optimally selected orifice diameter, in the bleed port of the solenoid valve 74. Thus, it will be clear that the brake pulsing apparatus can be adjusted to provide optimum stopping characteristics for substantially any vehicle having a vacuum assisted hydraulic brake system.

Operation of FIG. 2

At such times that a vehicle having the vacuum assisted hydraulic brake system 40 is proceeding normally along a roadway, the vacuum booster valve 46 will operate normally to block transmission of a brake signal to the vacuum booster diaphragm so that no brake signal will be received by the transducer 56 of FIG. 2. The switch 66 to the brake light 70 will be open so that no power will be transmitted to the timer relay 90 so that the contacts 92 of the timer relay 90 will be open and no electrical power will be transmitted to the solenoid 88 of valve 74. Accordingly, the first section 76 of the solenoid valve 74 will be positioned between the inlet and outlet ports of the valve 74 to transmit the vacuum existing in the engine manifold 44 to the valve 46 of the vacuum booster.

Should the driver of the vehicle now actuate the brake operating assembly 48, by depressing pedal 64, to bring the vehicle to stop, the valve 46 will open to open the brake signal conduit, the vacuum line 49 in FIG. 2, to transmission of the brake signal to the brake assembly 62 to initiate braking of the vehicle. Concurrently, because of the linking of the brake pedal 64 to the brake light switch 66, the switch 66 will be closed to transmit electrical power to the proximity switch 100 and timer relay 90. Accordingly, should the vehicle decelerate at a rapid rate, a condition in which the brakes are applied sufficiently to give rise to a danger of brake lockup, the depending member 110 of the pendulum 108 will displace from the vertical to permit the contacts 102 of the proximity switch 100 to close and transmit an enable signal via conductor 106 and resistor 96 to the timer relay 90. In response, the timer relay 90 will operate to repetitively close contacts 92 to repetitively transmit an interrupt signal to the solenoid 88 of the solenoid valve 74. The solenoid valve 74, in turn, will respond to the interrupt signals by repetitively drawing the section 78 of the solenoid valve 74 into position between the outlet and bleed ports of the solenoid valve 74. Thus, the brake signal will be repetitively interrupted by disruption of the connection of the inlet and outlet ports normally provided by the first section 76 of the valve 74 and the connection of the bleed port to the outlet port to introduce air into the portion 52 of the vacuum line 49. Consequently, the brake system 40 will operate to repetitively transmit, and interrupt transmission of, a brake signal to the brake assembly 62 to automatically provide a brake pumping action for the vehicle. As a result of such pumping action, the vehicle will be brought to rest without the loss of traction that might be caused by locking of the wheels of the vehicle to cause sliding of the vehicle.

An important aspect of the above described operation of the brake pulsing apparatus 42 in the braking of a vehicle is a fail-safe feature that results from the use of interruptions of a brake signal to effect the anti-lock characteristics the brake pulsing apparatus provides. Should the brake pulsing apparatus 42 fail to operate, the result would be that the section 76 of the solenoid valve 74 would remain in position between the inlet and outlet ports of the solenoid valve 74. Thus, the brake system would operate in its normal manner without the brake pumping feature that is provided by the brake pulsing apparatus. Similarly, should the brake pulsing apparatus be caused to operate at such times that the vehicle operator is not applying the brakes of the vehicle, such operation will have no effect on driving the vehicle. In such case, there will be no brake signal in the brake signal conduit in this case to be interrupted. Moreover, even this eventuality can be prevented by the above noted use of the brake light conductor 72 as the source of electrical power for the brake pulsing apparatus 42. Accordingly, no loss in normal braking capacity of the brake system 40 and no interference with normal driving of the vehicle can occur; rather, the brake pulsing apparatus can provide only an enhancement of the braking characteristics of a vehicle.

DESCRIPTION OF FIG. 6

FIG. 6 illustrates the use of the brake pulsing apparatus of the present invention with a pneumatic brake system that has been generally indicated by the reference numeral 160. In the pneumatic brake system, the brake assembly 62 of the hydraulic brake system 40 is replaced by a brake assembly 162 that operates in response to pressurized air, constituting the brake signal, received via a pressurized air line 164 that constitutes the brake signal conduit and is comprised of portions 166, 168, and 170. Such pressurized air is provided from a compressed air tank 172 and compressor (not shown) that constitute the brake signal source for the brake system 160. In the context of the present invention, the brake assembly 162 can be characterized as comprising a conventional brake relay 174 that responds to reception of the brake signal; that is, pressurized air from the tank 172 on the compressed air line 164, to transmit pressurized air received by the brake relay from the compressed air tank 172 on a supply line 165 to pneumatic cylinders 176 of conventional drum and shoe assemblies 177 upon which the wheels of the vehicle are mounted. Control of the brake system 160 by the vehicle operator is effected via conventional brake operating assembly 178 that is comprised of an air valve 180 connected within the pressurized air line 164 between portions 166 and 168 thereof. To operate the brakes, the brake pedal 64 is depressed to open valve 180 in a conventional manner and the pedal 64 is connected to the brake light switch 66 as in the vacuum-hydraulic brake system 40 to energize the brake light 70 when the brakes of the vehicle are applied.

To employ the brake pulsing apparatus of the present invention in the pneumatic brake system 160, the brake pulsing apparatus is selected to have a construction that may be identical to the brake pulsing apparatus 42 used with the vacuum hydraulic brake system 40. Accordingly, the brake pulsing apparatus of FIG. 3 has been designated 42A therein. As is the case for the brake pulsing apparatus 42, the brake pulsing apparatus 42A is generally comprised of a solenoid valve 74, identical to the solenoid valve used in the brake pulsing apparatus 42, and a timing assembly 80 that is similarly identical to the timing assembly 80 of the brake pulsing apparatus 42. Other, adaptive features of the brake pulsing apparatus will be described below.

To include the brake pulsing apparatus 42A in the brake system 160, the solenoid valve 74 is mounted in the pressurized air line 164; i.e., the brake signal conduit for the brake system 160, at any convenient location; for example, between the valve 180 of the brake operating assembly 178 and the brake relay 174 of the brake assembly 162, and the power terminals of the timer relay 90 (not shown in FIG. 6) and proximity switch 100 (not shown in FIG. 6) are connected to the vehicle electrical system downstream of the brake light switch 66 via the conductor 154 that connects to the vehicle brake light conductor 72 as in the brake system 40 shown in FIG. 2. More particularly, to mount the brake pulsing apparatus 42A in the brake system 160, the inlet port of the solenoid valve 74 can be connected to the portion 168 of the pressurized air line 164 from the valve 180 and the outlet port of the valve 74 can be connected to the portion 170 of the line 164 leading to the brake relay 174. Thus, in the absence of an interrupt signal received by the solenoid valve 74, the first section 76 of the valve 74 will transmit pressurized air from the valve 180 to the brake relay 174.

In its basic operation, the brake pulsing apparatus 42A repetitively interrupts the brake signal, pressurized air transmitted by pressurized air line 164, in the manner that has been described above for the brake pulsing apparatus 42. Specifically, at such times that the operator of a vehicle having the brake system 160 applies pressure to the brake pedal 64 to initiate deceleration of the vehicle, the accelerometer (not shown in FIG. 6) of the timing assembly 80 senses the deceleration of the vehicle to enable the timer relay (not shown in FIG. 6) of the timing assembly 80. The timing assembly 80 then repetitively transmits interrupt signals to the solenoid 88 of the solenoid valve 74 to cause the second section 78 of the solenoid valve 74 to be repetitively positioned between the bleed and outlet ports of the solenoid valve 74, to exhaust air from the portion 170 of the pressurized air line, while disrupting fluid communication between the inlet and outlet ports of the valve 74 via the section 76 of the valve 74. Thus, as in the case of inclusion of the brake pulsing apparatus 42 in the vacuum-hydraulic brake system, inclusion of the brake pulsing apparatus 42A in the pneumatic brake system 160 results in automatic pumping of the brakes of the vehicle having the brake system 160 by repetitive interruption of the brake signal used to effect operation of the brake assembly that retards rotation of the vehicle wheels.

As is the case for the brake pulsing apparatus 42, the brake pulsing apparatus 42A can include features that enable the brake pulsing apparatus to be adapted to the characteristics of the vehicle with which the apparatus 42A is used. These adaptive features will, of course, include features arising from the above-described construction of the accelerometer and, further, include adaptions related to the size and volume of components of the pneumatic brake system 160. Specifically, the brake pulsing apparatus 42A can be further comprised of an air flow limiter 182, identical to the air flow limiter 140 of FIG. 2, that is connected to the bleed port of the solenoid valve 74 in the same manner that the air flow limiter 140 is connected to the bleed port of the valve 74 in the brake pulsing apparatus 42. The operation of the air flow limiter 182 differs from the operation of the air flow limiter 140 only in that, while the air flow limiter 140 regulates the rate of air flow into portions of a vacuum line, the air flow limiter 182 regulates exhaust of air from portions of the pressurized air line 164.

A second adaptive feature is the inclusion in the brake pulsing apparatus 42A of a pressure switch 184 that is serially connected with power terminals of the timing assembly 80 in the manner that has been described above for the brake pulsing apparatus 42. In such case, the pressure switch 184 measures the pressure in the compressed air tank 172 and has normally closed contacts 186 that open when pressure in the air tank falls to a selected level to disable the brake pulsing apparatus 42A. Such a feature is used to prevent emergency braking systems commonly employed with pneumatic brake systems from being activated by the exhaust of air from the pressurized air line during interruption of the brake signal should pressure in the air tank fall to a low level and, more importantly, reserves any pressurized air in the compressed air tank to the emergency brake systems should a loss of air pressure in the tank 172 occur.

Additionally, and for purposes that will become clear below, it is contemplated that the brake pulsing apparatus 42A will, like the brake pulsing apparatus 42, include the electrical connector 152 that receives interrupt signals provided by the timing assembly 80 to the solenoid valve 74 on the conductor 89 that connects the coil of the solenoid valve to the timer relay 90 (not shown in FIG. 3).

DESCRIPTION OF FIG. 7

As is known in the art, it is common practice to equip trailers that may be towed by a variety of types of tractors which may be; for example, a passenger automobile, with electric brake systems that are actuated when the tractor decelerates. In many circumstances, these trailer brake systems are not provided with anti-lock features so that the brakes of the trailers are as susceptible to sliding as the brakes of any other vehicle. The present invention contemplates that trailers having electric brake systems may be provided with a modified form of brake pulsing apparatus that has been illustrated in FIG. 4.

Referring to FIG. 7, shown therein and designated by the general reference numeral 190 is an electric brake system that has been provided with a brake pulsing apparatus 192 that is a modification of the brake pulsing apparatus 42 and the brake pulsing apparatus 42A shown in FIGS. 2 and 6 respectively. In the electric brake system 190, the brake assembly is comprised of a plurality of conventional electrically operated drum and shoe assemblies 194 in FIG. 7, upon which wheels of the trailer are mounted. Each drum and shoe assembly 194 is comprised of an electromagnet 196 that responds to an electrical signal received by electromagnet 196 to effect a braking action on a vehicle in a manner that is known in the art and need not be discussed herein to provide a complete teaching of the present invention and the manner in which the invention is used with an electric brake system. Thus, in the brake system 190, the brake signal conduit 196 is an electrical conductor that is comprised of portions 198 and 200 in which the brake pulsing apparatus is mounted; preferably immediately upstream of the drum and shoe assembly 194. As is common practice, the electric brake system 190 is further comprised of a pendulum brake actuator 202 mounted on the towing vehicle to sense deceleration of such vehicle and provide an electrical signal to a brake driver 204 that passes an electrical current through the electromagnets 196 to retard rotation of the wheels of the trailer. Electrical power for operation of the electric brake system 190 is commonly provided by a towing vehicle battery 206.

Consistently with the above described operation of the brake system 190, the brake pulsing apparatus 192 differs from the brake pulsing apparatus 42 and the brake pulsing apparatus 42A in that the solenoid valve 74 of such brake pulsing apparati is replaced with a relay 208 having normally closed contacts 210 interposed in the brake signal conduit; that is, the connection between portions 198 and 200 thereof as shown in FIG. 7. For operation of the relay 208 to repetitively interrupt the brake signal; that is, an electrical current transmitted to the drum and shoe assembly 194, the brake pulsing apparatus 192 is further comprised of a timing assembly 80, identical to the timing assembly 80 shown in FIG. 2, that is connected to a coil 212 of the relay 208 in the same manner that the timing assembly 80 is connected to the coils of the solenoid valves 74 in the brake pulsing apparati 42 and 42A. As is also common practice, the trailer will be provided with stop lights that are interconnected with the stop lights of the towing vehicle and power for operation of the timing assembly 80 can be provided by tapping electrical conductors (not shown) leading to the stop lights of the trailer upon which the brake pulsing apparatus 192 is mounted.

The operation of the brake pulsing apparatus 192 differs from the operation of the brake pulsing apparati 42 and 42A only in that repetitive interruption of the brake signal, in the present example an electrical current passed through the electromagnet 196, is effected by the repetitive transmission of interrupt signals from the timing assembly 80 to the coil 212 of the relay 208 to repetitively open the contacts 210 of the relay 208 to interrupt the brake signal; that is, the electrical current supplied to the electromagnet 196, when the trailer decelerates.

DESCRIPTION OF FIG. 8

As has been noted above, tractor trailer combinations present special problems that have, in the past, complicated the problem of providing vehicles with anti-lock systems brake systems. For example, a tractor may be used with a variety of trailers and such use can give rise to problems of integrating anti-lock brake systems for the trailers with an anti-lock brake system of the tractor, especially when the trailers have brake systems of different types. Thus, unless a tractor and trailer are designed to operate as a single unit, synchronization of their brake systems may result in undesirable braking characteristics for the combination. The present invention provides an embodiment of the brake pulsing apparatus, shown in FIG. 8 and designated 300 therein, that will coordinate anti-lock braking of the trailer with anti-lock braking of the tractor without regard to the types of brake systems that might be found on the tractor and trailer. In the embodiment of the invention shown in FIG. 8, the brake pulsing apparatus 300 is comprised of a master brake pulser 302, which may be either of the apparati 42 or 42A described above, that is mounted in the brake signal conduit, designated 304 in FIG. 8, of the tractor between the tractor brake operating assembly, designated 306 in FIG. 8, and the tractor brake assembly, indicated at 308 in FIG. 8. The master brake pulser 302 operates as has been described above with respect to FIGS. 2 and 6 to pulse the brakes of the tractor in response to actuation of the brake operating assembly 306 by the operator of the vehicle to provide a brake signal from a brake signal source 310.

In circumstances in which the tractor and trailer brake systems are not provided as an integrated unit, the trailer brake system will be comprised of an auxiliary brake signal conduit 312 that provides a transmission path for an auxiliary brake signal to an auxiliary brake assembly 314 that constitutes the brake assembly of the trailer. Similarly, the brake system for the trailer will be comprised of an auxiliary brake operating assembly 316 that is mounted in the conduit 312 to block the transmission of the auxiliary brake signal, which can be provided by an auxiliary brake signal source 318 or from the tractor brake system as will be discussed more fully below, during normal driving of the tractor-trailer combination and transmits such signal when the vehicle operator actuates the brake operating assembly 306 to initiate slowing or stopping of the combination. Thus, the trailer brake system generally operates in the same manner as the tractor brake system so that the brakes of the trailer can be pulsed, to provide the trailer with anti-lock braking characteristics by repetitively interrupting the brake signal on the auxiliary brake signal conduit 312 in the same manner that the brake signal on the brake signal conduit 304 is interrupted. To this end, the brake pulsing apparatus 300 is comprised of an auxiliary brake signal interrupter 320 that is mounted in the auxiliary brake signal conduit 312 in the same manner that the solenoid valve 74 of the brake pulsing apparati 42 and 42A of the master brake pulser 302 is mounted in the brake signal conduit 304. The construction of the auxiliary brake signal interrupter 320 is selected on the basis of the type of brake system in the trailer brake system. Thus, if the trailer has a hydraulic or pneumatic brake system, the auxiliary brake signal interrupter 320 will be a solenoid valve; if the trailer has an electric brake system, the auxiliary brake signal interrupter will be a relay.

Operation of the auxiliary brake signal interrupter to pulse braking of the trailer is occasioned by operation of the master brake pulser 302 to pulse braking of the tractor by operating the auxiliary brake signal interrupter 320 via repetitive electrical interrupt signals supplied via the aforementioned electrical connector 152, shown in FIGS. 2 and 6, with which the brake pulsing apparati 42 and 42A are provided. Thus, at such times that the timer assembly 80 of the master brake pulser 302 provides interrupt signals to the solenoid valve 74 of the master brake pulser 302 to interrupt a brake signal on the brake signal conduit 304, it will concurrently provide interrupt signals to the auxiliary brake signal interrupter 320 to cause repetitive interruption of a brake signal on the brake signal conduit 312. Thus, at such times that the tractor-trailer combination is braked, both brake signals are interrupted in unison to provide a coordinated anti-lock braking action for both the trailer and the tractor that enable optimum braking of both elements of the combination.

Moreover, just as the adaptive features described above can be used to tailor the anti-lock braking characteristics provided by the brake pulsing apparati 42 and 42A to characteristics of a vehicle comprised of only one component, such adaptive features can be used to tailor the anti-lock braking characteristics of the brake pulsing apparatus 300 to the individual characteristics of a combination vehicle with which the brake pulsing apparatus 300 is used. FIGS. 9 through 12 illustrate exemplary tractor-trailer brake system combinations to permit a more complete explanation of the manner in which a brake pulsing apparatus constructed in the manner of the brake pulsing apparatus 300 is used to provide anti-lock braking of tractor-trailer combinations and the manner in which the adaptive features can be utilized to enhance these anti-lock braking characteristics.

DESCRIPTION OF FIG. 9

FIG. 9 illustrates the manner in which the brake pulsing apparatus 300 can be advantageously mounted in the brake systems of a tractor-trailer combination in which the tractor has a vacuum assisted hydraulic brake system 330 and the trailer has an electric brake system 332. For purposes of illustration, the tractor brake system has been drawn to have the same form as the representative vacuum assisted hydraulic brake system shown in FIG. 2 and remarks concerning such form in regard to FIG. 2 similarly apply to the tractor brake system 330 shown in FIG. 9.

For purposes of illustration, FIG. 9 has been drawn for the case in which the trailer brake system 332 is a commonly used type in which the trailer brake system 332 is comprised of a pressure controlled rheostat 334 that is connected to a tractor battery, indicated at 336 in FIG. 9, and the hydraulic lines leading to hydraulic cylinders 338 of; for example, drum and shoe assemblies 340 of the tractor brake system 330. (As is known in the art, the rheostat 334 would commonly be located on the tractor; however, functionally, the rheostat 334 is a component of the trailer brake system 332.) In such type of trailer brake system, such system is further comprised of a brake driver 342 which receives a signal from the pressure controlled rheostat 334 when the brakes of the tractor are applied to pass an electric current through coils of conventional brake and shoe assemblies upon which the wheels of the trailer are mounted as described with reference to FIG. 7.

It will thus be seen that the tractor brake system 330 will include a vacuum line 344 that is equivalent to the vacuum line 49 in FIG. 2 and the trailer brake system 332 will include an electrical conductor 346 that is equivalent to the electrical conductor of FIG. 7. Thus, in the brake pulsing apparatus 300 for the tractor-trailer combination, the master brake pulser (not numerically designated in FIG. 9) comprises a solenoid valve, equivalent to the solenoid valve 74 of FIG. 2 and so designated in the FIG. 9, that is mounted in the vacuum line 344 (the brake signal conduit) of the tractor brake system in the manner that has been previously described with reference to FIG. 2 and a timing assembly 80 that is identical to the timing assembly 80 of FIG. 2. In the trailer brake assembly, the auxiliary brake signal interrupter is a relay, equivalent to the relay 208 of FIG. 7 and so designated in FIG. 9, that is mounted in the conductor (the auxiliary brake signal conduit) in the manner previously described with reference to FIG. 7. Thus, when a tractor-trailer combination including the brake pulsing apparatus 300 is braked, the brakes of the tractor will be pulsed as described above with respect to FIG. 2 and the brakes of the trailer will be pulsed as described above with respect to FIG. 7.

As in the case of a single component vehicle, the present invention contemplates that the brake pulsing apparatus 300 may employ adaptive features to optimize the anti-lock characteristics provided by the brake pulsing apparatus 300 to the individual characteristics of a particular tractor-trailer combination. Thus, for example, it is contemplated that the pendulum of the timing assembly will be adjusted as has been described above to have a sensitivity that is suitable for the tractor-trailer combination at hand. Further optimization can be obtained by adjusting the cycle rate of the interrupt signals supplied to the solenoid valve 74 and relay 208 of the brake pulsing apparatus 300 to optimize the braking characteristics of the trailer and using an air flow limiter 348, mounted in the bleed port of the solenoid valve 74 to optimize the braking characteristics of the tractor.

DESCRIPTION OF FIG. 10

Figure 10:
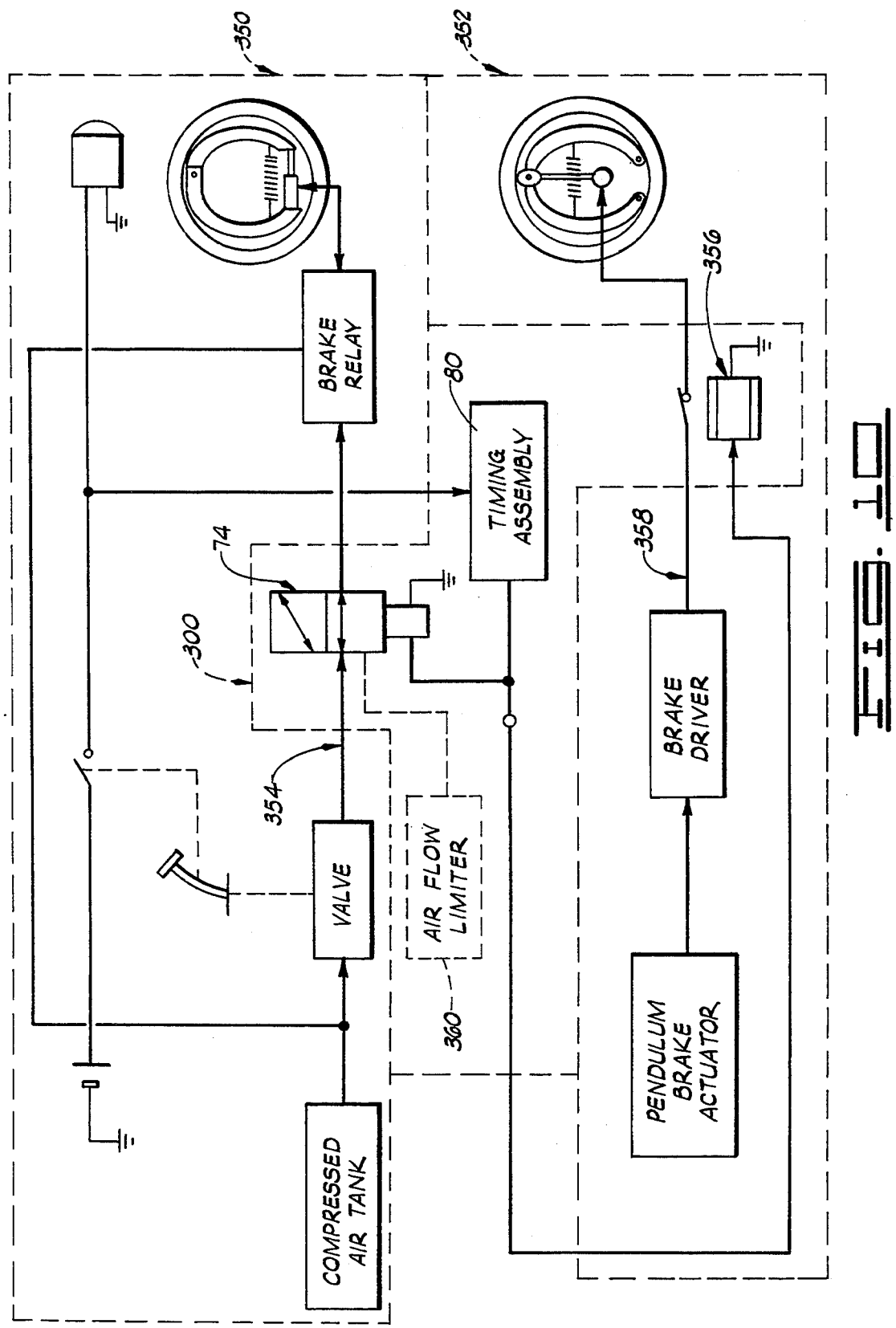
FIG. 10 is a block diagram of an exemplary tractor-trailer brake system illustrating the construction and mounting of the modified brake pulsing apparatus for a tractor having a pneumatic brake system and a trailer having an electric brake system.

FIG. 10 illustrates the manner in which the brake pulsing apparatus 300 can be advantageously mounted in the brake systems of a tractor-trailer combination in which the tractor has a pneumatic brake system 350 and the trailer has an electric brake system 352. Thus, the tractor brake system will have the general form that has been previously described with reference to FIG. 6 and the trailer brake system will have the general form that has been previously described with reference to FIG. 7. Accordingly, the master brake pulser (not numerically designated in FIG. 10) will generally be comprised of a timing assembly, identical to the timing assembly 80 of FIG. 6 and so designated in FIG. 10, and a solenoid valve 74 that is mounted in a pressurized air line 354 of the tractor brake system 350. The auxiliary brake signal interrupter for the trailer is a relay 356 having contacts mounted in a conductor 358 that is equivalent to the conductor of FIG. 7 to transmit an auxiliary brake signal that is equivalent to the brake signal transmitted along the conductor of FIG. 7. Thus, when the tractor-trailer combination is braked, the brakes of both the tractor and trailer will be pulsed by repetitive interruption of the pressurized air signal (the brake signal) on the pressurized air line 354 by the solenoid valve 74 and interruption of the electrical signal on the conductor 358 by the relay 356 in response to repetitive interrupt signals generated by the timing assembly 80.

As in the case of the combination vehicle comprising a tractor having a vacuum assisted hydraulic brakes and a trailer having an electric brake system, the brake pulsing apparatus 300 can include an air flow limiter 360 to permit optimization of the braking characteristics of both the tractor and the trailer.

DESCRIPTION OF FIG. 11

FIG. 11 illustrates the use of the brake pulsing apparatus 300 in a tractor-trailer combination wherein both brake system 370 of the tractor and brake system 372 of the trailer are vacuum assisted hydraulic brake systems. Thus, the tractor brake system 370 has been illustrated as identical to the brake system 40 of FIG. 2 to include a vacuum line 374 in which a solenoid valve, equivalent to the solenoid valve 74 of FIG. 2 and so designated in FIG. 11, of the master brake pulser (not numerically designated in FIG. 11) can be mounted to pulse the brakes of the tractor in response to interrupt signals received from the timing assembly 80 of the master brake pulser.

The trailer brake system 372 has been illustrated as a common type of vacuum assisted hydraulic brake system found in trailers used with tractors having vacuum assisted hydraulic brake systems. Such trailer brake systems include a hydraulic vacuum controller 376 that is connected to hydraulic lines of the tractor brake system and to the manifold of the tractor engine to provide a vacuum signal, constituting the auxiliary brake signal of the present invention, to the trailer when the brakes of the tractor are operated. (The hydraulic vacuum controller, though mounted on the tractor, is functionally a portion of the trailer brake system.) The auxiliary brake signal is transmitted to a suitable transducer 378 that converts the signal to hydraulic pressure that operates the trailer brakes in the manner that has been described above with respect to FIG. 2. The auxiliary brake signal interrupter in such a tractor-trailer combination can conveniently be a second solenoid valve 380, identical to the solenoid valve 74, that is mounted in a vacuum line 382 between the controller 376 and transducer 378 to be repetitively actuated by interrupt signals received from the timing assembly 80 via connection of a coil 384 of the solenoid valve 380 to the previously described electrical connector 152. Thus, the brakes of the tractor and trailer will be concurrently pulsed by repetitive interruption of vacuum signals on the vacuum lines 374 and 382, as has been described above for a single component vehicle, when the tractor trailer combination is braked.

Adaptive features usable to adjust the operation of the brake pulsing apparatus 300 to the characteristics of the tractor and trailer can include air flow limiters 386 and 388 that are mounted in the bleed ports of the solenoid valves 74 and 380 respectively.

DESCRIPTION OF FIG. 12

FIG. 12 illustrates the use of the brake pulsing apparatus 300 in a tractor-trailer combination wherein both brake system 390 of the tractor and brake system 392 of the trailer are pneumatic brake systems. Thus, the tractor brake system 390 has been illustrated as identical to the brake system 160 of FIG. 6 to include a pressurized air line 394 in which a solenoid valve, equivalent to the solenoid valve 74 of FIG. 6 and so designated in FIG. 11, of the master brake pulser (not numerically designated in FIG. 11) can be mounted to pulse the brakes of the tractor in response to interrupt signals received from the timing assembly 80 of the master brake pulser.

A brake system often used in trailers that are towed by tractors having pneumatic brake systems is comprised of a brake relay that receives pressurized supply air from a compressed air tank 398 of the tractor and a pneumatic control signal from the control valve 400 that operates the tractor brakes to transmit the supply air to pneumatic cylinders, such as pneumatic cylinder 402, in drum and shoe assemblies, such as the assembly 404 upon which the trailer wheels are mounted to spread shoes in the drum and shoe assemblies to retard rotation of the wheels. Thus, the trailer brake system includes a pressurized air line 406 from the valve 400 that is the equivalent of the pressurized air line 394 of the tractor brake system 390 and such pressurized air line provides a suitable auxiliary brake signal conduit in which a solenoid valve 408 can be mounted, as has been previously described, to serve as the auxiliary brake signal interrupter. To this end, the coil of the solenoid valve is connected to the aforementioned electrical connector 152 so that the solenoid valve 408 will be repetitively actuated by timing assembly 80 concurrently with actuation of the solenoid valve 74 to repetitively interrupt the auxiliary brake signal, a pressurized air signal on the line 406, as the brake signal on the line 394 of the tractor is interrupted by the solenoid valve 74. Thus, the brakes of both the tractor and the trailer will be pulsed as the tractor-trailer combination is decelerated to a halt.

As in the case of the tractor-trailer combination in which both the tractor and trailer have vacuum assisted hydraulic brakes, optimization of stopping characteristics of the tractor-trailer combination in which both the tractor and the trailer have pneumatic brakes can be effected using air flow limiters 410 and 412 mounted in the bleed ports of the solenoid valves 74 and 408 respectively in the pressurized air lines of the tractor brake system 390 and the trailer brake system 392.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a vehicle brake system of the type comprising:
   a brake assembly responsive to a fluid pressure brake signal for retarding rotation of wheels of the vehicle;
   brake signal source means for providing the brake signal;

a brake signal conduit for providing a signal path along which the brake signal can be transmitted from the brake signal source means to the brake assembly; and brake operating means mounted within the brake signal conduit for blocking the brake signal in a non-actuated state of the brake operating means and transmitting the brake signal in an actuated state of the brake operating means, the improvement wherein the brake system further comprises a brake pulsing apparatus operable from a source of electrical power comprising:

brake signal interruption means positioned within said brake signal conduit for interrupting the transmission of the brake signal in response to reception of an electrical interrupt signal;

timer means, connected to the brake signal interruption means and to said source of electrical power, for repetitively providing said electrical interrupt signal to the brake signal interruption means in response to reception of an electrical enable signal by the timer means and electrical power from said source of electrical power; and an accelerometer comprising:

a normally closed proximity switch connected to the timer means and connected to said source of electrical power for providing said electrical power enable signal to the timer means in the normally closed condition of the proximity switch; and a pendulum, comprising:

a depending member; and means for pivotably supporting the depending member above the proximity switch for opening the proximity switch at such times that the depending member is axially aligned with the proximity switch.

2. The vehicle brake system of claim 1 wherein the depending member of the pendulum comprises:

a radially expansible shaft; and a bob, having an opening smaller than the maximum diameter of said shaft formed therethrough, mounted on the shaft via passage of the shaft through said opening, whereby the bob is positionable on said shaft to enable adjustment of the relationship between acceleration of the accelerometer and displacement of the pendulum from a position of axial alignment with the proximity switch.

3. The vehicle brake system of claim 2 wherein the depending member of the pendulum is further comprised of a proximity switch control member having a shaft portion disposed in the lower end of the radially expansible shaft of the depending member and a head positioned adjacent the lower end of the radially expansible shaft to overlay the proximity switch at such times that the depending member is axially aligned with the proximity switch, whereby the size of the head can be selected to select a minimum acceleration at which the brakes of the vehicle are pulsed.

4. The vehicle brake system of claim 2 wherein the means for pivotably supporting the depending member of the pendulum is further characterized as a means for supporting the pendulum member for omnidirectional motion of the pendulum about the vertical and wherein the accelerometer further comprises means for limiting pivotation of the depending member from a position of axial alignment with the proximity switch.

5. The vehicle brake system of claim 1 wherein the timing means is further characterized as comprising:

a timer relay of the type having internal contacts for repetitively transmitting electrical power between power terminals of the timer relay in response to an enable signal received at an enable terminal of the timer relay and wherein the timer relay is further characterized as being of the type that provides electrical pulses at a cycle rate dependent upon the input resistance to the timer relay at the enable terminal of the timer relay; and a resistor connected between the contacts of the proximity switch and the enable terminal of the timer relay for selecting the cycle rate of electrical pulses provided by the timer relay.

6. The vehicle brake system of claim 1 wherein the brake signal conduit comprises a vacuum line fluidly communicated with an engine manifold of the vehicle, wherein the brake signal interruption means comprises a solenoid valve connected between portions of the vacuum line and wherein said solenoid valve is characterized as being of the type having inlet and outlet ports that are fluidly communicated in a deactuated state of the solenoid valve caused by the absence of reception by the solenoid valve of said interrupt signal, and a bleed port, open to the atmosphere, that is fluidly communicated with the outlet port in an actuated state of the solenoid valve caused by reception of said interrupt signal by the solenoid valve whereby the solenoid valve will admit air into portions of the vacuum line via the outlet and bleed ports in the actuated state of the solenoid valve.

7. The vehicle brake system of claim 6 further comprising means for limiting the flow rate of air into the bleed port of the solenoid valve.

8. The vehicle brake system of claim 7 wherein the means for limiting the flow rate of air into the bleed port of the solenoid valve is characterized as comprising a cup having an orifice formed through the closed end thereof mounted within the bleed port of the solenoid valve.

9. The vehicle brake system of claim 6 further comprising:

a reserve vacuum tank fluidly communicated with the vehicle engine manifold, wherein the brake pulsing apparatus further comprises a pressure operated switch fluidly communicated with the reserve vacuum tank to sense the pressure in the reserve vacuum tank, said pressure operated switch having normally closed contacts serially connected between power terminals of the timing means and the electrical power source; and wherein said switch is further characterized as being of the type wherein said normally closed contacts are opened at such time that the switch senses a pressure greater than a selected pressure, whereby the generation of interrupt signals by the timing means will be suppressed should pressure in the reserve vacuum tank rise to said selected level.

10. The vehicle brake system of claim 1 wherein the brake signal conduit comprises:

a pressurized air line, wherein the brake signal interruption means comprises a solenoid valve connected between portions of the pressurized air line; wherein said solenoid valve is characterized as being of the type having inlet and outlet ports that are fluidly communicated in a deactuated state of the solenoid valve caused by the absence of reception by the solenoid valve of said interrupt signal, and a bleed port, open to the atmosphere, that is fluidly communicated with the outlet port in an actuated state of the solenoid valve caused by reception of said interrupt signal by the solenoid valve, whereby the solenoid valve will exhaust air from portions of the pressurized air line in the actuated state of the solenoid valve.

11. The vehicle brake system of claim 10 further comprising means for limiting the flow rate of air from the bleed port of the solenoid valve.

12. The vehicle brake system of claim 11 wherein the means for limiting the flow rate of air from the bleed port of the solenoid valve is characterized as comprising a cup having an orifice formed through the closed end thereof mounted within the bleed port of the solenoid valve.

13. The vehicle brake system of claim 10 wherein the brake signal source means is further characterized as comprising:
 a compressed air tank,
wherein the brake pulsing apparatus further comprises a pressure operated switch fluidly communicated with the compressed air tank for sensing air pressure in said compressed air tank, said pressure operated switch having normally closed contacts serially connected between power terminals of the timing means and the electrical power source; and
wherein said switch is further characterized as being of the type wherein said normally closed contacts are opened at such time that the switch senses a pressure less than a selected pressure, whereby generation of interrupt signals is suppressed should pressure in the compressed air tank fall to said selected level.

14. The vehicle brake system of claim 1 further comprising an auxiliary brake system comprising:
 an auxiliary brake assembly and an auxiliary brake signal conduit for transmitting a brake signal to the auxiliary brake assembly;
wherein the brake pulsing apparatus further comprises auxiliary brake signal interruption means positioned within the auxiliary brake signal conduit for interrupting the auxiliary brake signal transmitted thereby in response to an electrical interrupt signal; and
wherein the timer means is connected to the auxiliary brake signal interruption means for providing an electrical interrupt signal to the auxiliary brake signal interruption means at such times that the timer means provides an interrupt signal to the brake signal interruption means.

15. The vehicle brake system of claim 14 for a vehicle comprising a tractor-trailer combination in which the brake system is further characterized as comprising a brake system for the tractor, the tractor brake system comprising the brake assembly, the brake signal source means, the brake signal conduit, the brake operating means and the brake pulsing apparatus; wherein the brake signal conduit comprises:
 a vacuum line fluidly communicable with an engine manifold of the tractor and the auxiliary brake system is further characterized as a brake system for the trailer in which the auxiliary brake signal conduit comprises an electrical conductor, wherein the brake signal interruption means comprises a tractor solenoid valve connectable between portions of said vacuum line of the tractor brake system;
wherein the tractor solenoid valve is characterized as being of the type having inlet and outlet ports that are fluidly communicated is a deactuated state of the solenoid valve caused by the absence of reception by the tractor solenoid valve of said interrupt signal, and a bleed port, open to the atmosphere, that is fluidly communicated with the outlet port in an actuated state of the tractor solenoid valve caused by reception of said interrupt signal by the solenoid valve, whereby the tractor solenoid valve will admit air into portions of the vacuum line via the outlet and bleed ports in the actuated state of the solenoid valve; and
wherein the auxiliary brake signal interruption means comprises a relay having contacts connectable between portions of said electrical conductor.

16. The vehicle brake system of claim 14 for a vehicle comprising a tractor-trailer combination in which the brake system is further characterized as comprising a brake system for the tractor, the tractor brake system comprising the brake assembly, the brake signal source means, the brake signal conduit, the brake operating means and the brake pulsing apparatus; wherein the brake signal conduit comprises:
 a pressurized air line of the tractor brake system for transmitting pressurized air to the brake assembly of the tractor and the auxiliary brake system is further characterized as a brake system for the trailer in which the auxiliary brake signal conduit comprises an electrical conductor,
wherein the brake signal interruption means comprises:
 a tractor solenoid valve connected between portions of the pressurized air line of the tractor brake system;
wherein the tractor solenoid valve is characterized as being of the type having inlet and outlet ports that are fluidly communicated in a deactuated state of the tractor solenoid valve caused by the absence of reception by the tractor solenoid valve of said interrupt signal, and a bleed port, open to the atmosphere, that is fluidly communicated with the outlet port in an actuated state of the tractor solenoid valve caused by reception by the solenoid valve of said interrupt signal, and a bleed port, open to the atmosphere, that is fluidly communicated with the outlet port in an actuated state of the tractor solenoid vale caused by reception of said interrupt signal by the solenoid valve, whereby the tractor solenoid valve will exhaust air from portions of the pressurized air line of the tractor brake system in the actuated state of the tractor solenoid valve; and
wherein the auxiliary brake signal interruption means comprises a relay having contacts connected between portions of the electrical conductor.

17. The vehicle brake system of claim 14 for a vehicle comprising:
 a tractor-trailer combination in which the brake system is further characterized as comprising a brake system for the tractor, the tractor brake system comprising the brake assembly, the brake signal source means, the brake signal conduit, the brake operating means and the brake pulsing apparatus; wherein the brake signal conduit comprises a vacuum line fluidly communicated with an engine manifold of the tractor and the auxiliary brake system is further characterized as a brake system for the trailer in which the auxiliary brake signal conduit comprises a vacuum line fluidly communicated with the tractor engine manifold, wherein the brake signal interruption means comprises a tractor solenoid valve connected between portions of said vacuum line of the tractor brake system;

wherein the auxiliary brake signal interruption means comprises a trailer solenoid valve connected between portions of said vacuum line of the trailer brake system; and wherein each of the tractor and trailer solenoid valves is of the type having inlet and outlet ports, fluidly communicated is a deactuated state of the solenoid valve caused by the absence of reception of an interrupt signal by the valve, and a bleed port, open to the atmosphere, fluidly communicated with the outlet port in an actuated state of the valve caused by reception of said interrupt signal by the valve, whereby the tractor and trailer solenoid valves are connected in said vacuum lines to admit air into portions of the vacuum lines via the bleed ports of the tractor and trailer solenoid valves in the actuated states of the tractor and trailer solenoid valves.

18. The vehicle brake system of claim 17 further comprising means for limiting the flow rate of air into the bleed port of the trailer solenoid valve.

19. The vehicle brake system of claim 18 wherein the means for limiting the flow rate of flow of air into the bleed port of the trailer solenoid valve is characterized as comprising a cup having an orifice formed through the closed end thereof mounted within the bleed port of trailer solenoid valve.

20. The vehicle brake system of claim 18 further comprising means for limiting the flow rate of air into the bleed port of the tractor solenoid valve.

21. The vehicle brake system of claim 14 for a vehicle comprising a tractor-trailer combination in which the brake system is further characterized as comprising a brake system for the tractor, the tractor brake system comprising the brake assembly, the brake signal source means, the brake signal conduit, the brake operating means and the brake pulsing apparatus; wherein the brake signal conduit comprises:

a pressurized air line for transmitting pressurized air to the brake assembly of the tractor and the auxiliary brake system is further characterized as a brake system for the trailer in which the auxiliary brake signal conduit comprises a pressurized air line for transmitting pressurized air to a brake assembly of the trailer, wherein the brake signal interruption means comprises a tractor solenoid valve connectable between portions of the pressurized air line of the tractor brake system;

wherein the auxiliary brake signal interruption means comprises a trailer solenoid valve connectable between portions of the pressurized air line of the trailer; and wherein each of the tractor and trailer solenoid valves are of the type having inlet and outlet ports, fluidly communicated in deactuated states of the tractor and trailer solenoid valves caused by the absence of reception of interrupt signals by said valves, and a bleed port, open to the atmosphere, fluidly communicated with the outlet port in actuated states of said valves caused by reception of said interrupt signal by said valves, whereby the tractor and trailer solenoid valves are connected in said pressurized air lines to exhaust pressurized air from portions of said pressurized air lines via the bleed ports of the tractor and trailer solenoid valves in the actuated states of the tractor and trailer solenoid valves.

22. The vehicle brake system of claim 21 further comprising means for limiting the flow rate of air through the bleed port of the trailer solenoid valve.

23. The vehicle brake system of claim 22 wherein the means for limiting the flow rate of air through the bleed port of the trailer solenoid valve is characterized as comprising a cup having an orifice formed through the closed end thereof mounted within the bleed port of the trailer solenoid valve.

24. The vehicle brake system of claim 22 further comprising means for limiting the flow rate of air through the bleed port of the tractor solenoid valve.

* * * * *

UNITED STATES PATENT AND TRADEMARK OFFICE
CERTIFICATE OF CORRECTION

PATENT NO. : 5,342,117
DATED : August 30, 1994
INVENTOR(S) : Thomas D. Price and James C. Roberts It is certified that error appears in the above-indentified patent and that said Letters Patent is hereby corrected as shown below:

Title page, item [56] 4,196,936, delete "188/112A" and substitute therefor --303/20;

Column 4, line 1, delete "be come" and substitute therefor --become--;

Column 5, line 29, delete "26,26" and substitute therefor --26--; and

Column 5, line 65, after "may" insert --be--.

Signed and Sealed this

Fifth Day of September, 1995

Attest:

BRUCE LEHMAN

Attesting Officer     Commissioner of Patents and Trademarks